(12) United States Patent
Yavnilovich et al.

(10) Patent No.: US 10,411,894 B1
(45) Date of Patent: Sep. 10, 2019

(54) AUTHENTICATION BASED ON UNIQUE ENCODED CODES

(71) Applicant: CyberArk Software Ltd., Petach-Tikva (IL)

(72) Inventors: Michael Yavnilovich, Petach-Tikva (IL); Evgeni Aizikovich, Petach-Tikva (IL); Boris Spivak, Petach-Tikva (IL)

(73) Assignee: CYBERARK SOFTWARE LTD., Petach-Tikva (IL)

(*) Notice: Subject to any disclaimer, the term of this patent is extended or adjusted under 35 U.S.C. 154(b) by 0 days.

(21) Appl. No.: 16/414,836

(22) Filed: May 17, 2019

(51) Int. Cl.
*H04L 9/32* (2006.01)
*H04W 12/00* (2009.01)
*G06F 21/35* (2013.01)
*H04L 9/08* (2006.01)

(52) U.S. Cl.
CPC ........... *H04L 9/3228* (2013.01); *G06F 21/35* (2013.01); *H04L 9/0825* (2013.01); *H04L 9/3231* (2013.01); *H04W 12/0013* (2019.01)

(58) Field of Classification Search
CPC ... H04L 9/3228; H04L 9/0825; H04L 9/3231; H04W 12/0013; G06F 21/35
See application file for complete search history.

(56) References Cited

U.S. PATENT DOCUMENTS

| | | | | |
|---|---|---|---|---|
| 6,694,025 B1* | 2/2004 | Epstein | ............. | H04L 9/083 380/277 |
| 8,189,788 B2* | 5/2012 | Narendra | ............. | H04L 9/0866 380/270 |
| 9,286,457 B2* | 3/2016 | Beatson | ............. | G06F 21/32 |
| 2002/0124176 A1* | 9/2002 | Epstein | ............. | G06Q 20/341 713/186 |
| 2007/0011466 A1* | 1/2007 | Imura | ............. | G07C 9/00142 713/186 |
| 2012/0297190 A1* | 11/2012 | Shen | ............. | H04L 9/0866 713/168 |

OTHER PUBLICATIONS

Aciobanitei et al. Using Cryptography in the Cloud for Lightweight Authentication Protocols Based on QR Codes, May 2018, IEEE 12th International Symposium on Applied Computational Intelligence and Informatics (SACI), pp. 000539-000542 (Year: 2018).*

* cited by examiner

Primary Examiner — Kenneth W Chang
(74) Attorney, Agent, or Firm — Finnegan, Henderson, Farabow, Garrett & Dunner LLP

(57) ABSTRACT

Disclosed embodiments relate to systems and methods for authenticating users of personal computing devices using encoded versions of the temporary and unique codes. Techniques include receiving a first cryptographic key having been created by a personal computing device and corresponding to a second cryptographic key maintained on the personal computing device; associating a user identifier with the first cryptographic key; accessing a temporary and unique code; accessing an encoded version of the temporary and unique code; making available to the personal computing device the encoded version of the temporary and unique code; receiving, from the personal computing device, a signed version of the temporary and unique code, the signed version having been signed by the second cryptographic key; verifying, using the first cryptographic key, the signed version of the temporary and unique code; and determining, based on the verifying, whether to authenticate the user of the personal computing device.

20 Claims, 14 Drawing Sheets

AUTHENTICATION BASED ON UNIQUE ENCODED CODES

BACKGROUND

In modern electronic computing and communications systems, usernames and passwords are widely used. From human users to applications that automatically communicate over networks, usernames and passwords (and similar credentials) are routinely used for authentication and providing access to various types of applications. Authentication schemes based on usernames and passwords provide a basic level of security, so that attackers cannot freely impersonate or misuse the accounts or resources of other identities.

The widespread use of usernames and passwords, however, gives rise to several significant technical problems. When users choose passwords, they tend to favor simple and easy-to-remember passwords, which can be easy to steal or replicate. These problems are worsened when users rely on a single password for two or more services, since one theft of the password can result in two different misuses of the password. To address this, some password management schemes require users to have long passwords, or passwords containing unusual characters, which become difficult for users to remember. When users forget their password, they are often required to reset their password or contact an IT support department, which imposes usability and efficiency impediments for both the user and the enterprise they are interacting with. Passwords that are chosen for users are often similarly hard to remember for users and result in the same problems. In addition, requirements to periodically change passwords further accentuate these problems, with users having increased difficulty remembering their changing passwords. Even passwords used by autonomously communicating applications have usability and security drawbacks. These passwords are often hard-coded into applications, which make the applications vulnerable to password theft and misuse.

Another response to the potential weaknesses in usernames and passwords is two-factor authentication. But this too has drawbacks. While two-factor authentication can make it more difficult for an attacker to impersonate a user or steal their credentials, two-factor authentication can be problematic when one form of the authentication (e.g., Internet-based prompts, cellular-based prompts, etc.) is unavailable. For example, when a user is traveling and has no Internet or cellular coverage, two-factor authentication may be unavailable. Further, two-factor authentication is vulnerable to network delays and can be cumbersome for users to manage. Additionally, some forms of two-factor authentication require a user to carry a special-purpose authentication tool (e.g., an RSA™ SecurID fob), which may be inconvenient for users and thus lead to insecure work-around solutions where users try to bypass such security requirements.

Accordingly, in view of these and other deficiencies in existing techniques for authenticating users, applications, or other identities, technological solutions are needed for providing secure authentication without undue complexity or usability deficiencies. As discussed below, the technological limitations in existing authentication schemes may be addressed by implementing a security service to interact with a user's personal computing device. When authentication of the user or their device is needed, the security service can generate a unique ID and encode it into a code (e.g., visual code, audible code, etc.) that is made available to the personal computing device. The personal computing device can then decode the code to reveal the unique ID. The personal computing device can further utilize a biometric identification of the user (e.g., based on a fingerprint, retinal scan, facial scan, etc.) to retrieve a locally stored cryptographic key, and sign a communication back to the security service containing the unique ID. The security service can then verify the signature of the communication based on a corresponding cryptographic key it holds. If the signature is verified, the security service may authenticate the user or their personal computing device, or may further authorize the user or their device to perform actions (e.g., access secure applications, perform transactions, access physical locations, etc.).

Notably, using these techniques, even if an attacker wrongfully gains access to the encoded code and is able to decode the code, they will still not be authenticated. The attacker will not have the biometrics of the rightful user and will not be able to access the encrypted cryptographic key stored on the personal computing device for use in signing a communication back to the security service. Indeed, even if the attacker gains access to both the encoded code and the user's personal computing device, they will still not be authenticated, since they will lack the biometrics needed to decrypt the encrypted cryptographic key stored on the personal computing device. As discussed further below, variations on this secure authentication process are contemplated as well.

Additional techniques described below, which address the above and other problems with conventional data communication techniques, include utilizing machine-readable codes to provide for secure communications or sessions. As discussed below, a cryptographic key may be encoded into a machine-readable code and made available to a personal computing device. A corresponding key may be made available to a target resource The personal computing device may scan and decode the code, thus revealing the cryptographic key, which may be used by the personal computing device to encrypt a data communication to be transmitted to the secure target resource. The secure target resource, having access to its corresponding cryptographic key, can then decrypt the communication, thus confirming the validity of the communication and its transmission from an authorized personal computing device. Thereafter, a communications session between the personal computing device and the secure target resource may be secured. As with the above techniques, this process may further involve the personal computing device utilizing the user's biometric data to retrieve an encrypted cryptographic key from the personal computing device, which may be used to authenticate the user of the personal computing device.

SUMMARY

Some disclosed embodiments describe non-transitory computer readable media, systems, and methods for authenticating users of personal computing devices using encoded versions of the temporary and unique codes. Additional disclosed embodiments describe non-transitory computer readable media, systems, and methods for utilizing machine-readable encoded codes to provide secure communications between personal computing devices and secure target resources.

For example, in an exemplary embodiment, there may be a non-transitory computer readable medium including instructions that, when executed by at least one processor, cause the at least one processor to perform operations for authenticating users of personal computing devices using encoded versions of the temporary and unique codes. The operations may comprise receiving a first cryptographic key, the first cryptographic key having been created by a personal computing device and corresponding to a second cryptographic key maintained on the personal computing device; associating a user identifier with the first cryptographic key; accessing a temporary and unique code; accessing an encoded version of the temporary and unique code; making available over short-range communications, to the personal computing device, the encoded version of the temporary and unique code; wherein the personal computing device is configured to decode the encoded version of the temporary and unique code to yield the temporary and unique code, to obtain biometric data from a user of the personal computing device, and to decrypt the second cryptographic key based on the obtained biometric data; receiving, from the personal computing device, a signed version of the temporary and unique code, the signed version having been signed by the second cryptographic key; verifying, using the first cryptographic key, the signed version of the temporary and unique code; and determining, based on the verifying, whether to authenticate the user of the personal computing device.

According to a disclosed embodiment, accessing the temporary and unique code includes generating a universally unique identifier.

According to a disclosed embodiment, the first cryptographic key is a public key from a public-private key pair generated by the personal computing device.

According to a disclosed embodiment, the second cryptographic key is a private key from a public-private key pair generated by the personal computing device.

According to a disclosed embodiment, the first cryptographic key and the second cryptographic key are each a symmetric key generated by the personal computing device.

According to a disclosed embodiment, associating the user identifier with the first cryptographic key includes generating the user identifier and storing the user identifier in association the first cryptographic key.

According to a disclosed embodiment, the operations further comprise providing the user identifier to the personal computing device.

According to a disclosed embodiment, the personal computing device is further configured to decrypt the user identifier based on the biometric data.

According to a disclosed embodiment, the operations further comprise receiving, from the personal computing device, a signed version of the user identifier, the signed version having been signed by the second cryptographic key.

According to a disclosed embodiment, the user is concurrently using the personal computing device and an endpoint resource requiring the authentication of the user.

According to another disclosed embodiment, there may be a computer-implemented method for authenticating users of personal computing devices using encoded versions of the temporary and unique codes. The method may comprise receiving a first cryptographic key, the first cryptographic key having been created by a personal computing device and corresponding to a second cryptographic key maintained on the personal computing device; associating a user identifier with the first cryptographic key; accessing a temporary and unique code; accessing an encoded version of the temporary and unique code; making available, to the personal computing device, the encoded version of the temporary and unique code; wherein the personal computing device is configured to decode the encoded version of the temporary and unique code to yield the temporary and unique code, to obtain biometric data from a user of the personal computing device, and to decrypt the second cryptographic key based on the obtained biometric data; receiving, from the personal computing device, a signed version of the temporary and unique code, the signed version having been signed by the second cryptographic key; verifying, using the first cryptographic key, the signed version of the temporary and unique code; and determining, based on the verifying, whether to authenticate the user of the personal computing device.

According to a disclosed embodiment, making available the encoded version of the temporary and unique code includes at least one of: displaying the encoded version visually to the personal computing device, or wirelessly transmitting through near-field communications the encoded version to the personal computing device.

According to a disclosed embodiment, the encoded version of the temporary and unique code is at least one of a two-dimensional bar code, a one-dimensional bar code; or an encoded image.

According to a disclosed embodiment, the personal computing device includes an imaging interface configured to optically scan and decode the encoded version of the temporary and unique code.

According to a disclosed embodiment, associating the user identifier with the first cryptographic key includes generating the user identifier and storing the user identifier in association with the first cryptographic key.

According to a disclosed embodiment, the method further comprises providing the user identifier to the personal computing device.

According to a disclosed embodiment, the personal computing device is further configured to decrypt the user identifier based on the biometric data.

According to a disclosed embodiment, the method further comprises receiving, from the personal computing device, a signed version of the user identifier, the signed version having been signed by the second cryptographic key.

According to a disclosed embodiment, the method further comprises decrypting, using the first cryptographic key, the signed version of the user identifier.

According to a disclosed embodiment, the method further comprises providing, to an application requiring authentication of the user, an authenticated identity associated with the user based on the verifying.

According to another disclosed embodiment, there may be a non-transitory computer readable medium including instructions that, when executed by at least one processor, cause the at least one processor to perform operations for utilizing machine-readable encoded codes to provide secure communications between personal computing devices and secure target resources. The operations may comprise accessing a first cryptographic communications key, the first cryptographic communications key being associated with a second cryptographic communications key accessible to a secure target resource; generating a machine-readable encoded code, the machine-readable encoded code encoding the first cryptographic communications key; and making available, to a personal computing device, the machine-readable encoded code; wherein the personal computing device is configured to decode the machine-readable encoded code to yield the first cryptographic communications key, encrypt at least one portion of a data communication using the first cryptographic communications key, and transmit the encrypted at least one portion of the data communication to the secure target resource; and wherein the secure target resource is configured to decrypt the encrypted at least one portion of the data communication using the second cryptographic communications key.

According to a disclosed embodiment, the personal computing device is further configured to anonymously, from the perspective of the secure target resource, transmit the encrypted at least one portion of the data communication to the secure target resource.

According to a disclosed embodiment, the first cryptographic communications key is a public key, and the second cryptographic communications key is a private key corresponding to the public key.

According to a disclosed embodiment, the first cryptographic communications key and the second cryptographic communications key are each an instance of a single symmetric key.

According to a disclosed embodiment, the machine-readable encoded code further encodes a temporary and unique code.

According to a disclosed embodiment, the personal computing device is further configured to decode the machine-readable encoded code to yield the temporary and unique code, to obtain biometric data from a user of the personal computing device, and to decrypt a cryptographic authentication key based on the obtained biometric data.

According to a disclosed embodiment, the operations further comprise receiving, from the personal computing device, a signed version of the temporary and unique code, the signed version having been signed by the cryptographic authentication key.

According to a disclosed embodiment, the operations further comprise authenticating at least one of the user or the personal computing device based on a verification of the signed version of the temporary and unique code.

According to a disclosed embodiment, the operation of making available the machine-readable encoded code is performed responsive to identifying a request by the personal computing device to access the secure target resource.

According to a disclosed embodiment, identifying the request includes intercepting the request, the request being initially addressed to the secure target resource.

According to another disclosed embodiment, there may be a computer-implemented method for utilizing machine-readable encoded codes to provide secure communications between personal computing devices and secure target resources. The method may comprise accessing a first cryptographic communications key, the first cryptographic communications key being associated with a second cryptographic communications key accessible to a secure target resource; generating a machine-readable encoded code, the machine-readable encoded code encoding the first cryptographic communications key; and making available, to a personal computing device, the machine-readable encoded code; wherein the personal computing device is configured to decode the machine-readable encoded code to yield the first cryptographic communications key, encrypt at least one portion of a data communication using the first cryptographic communications key, and transmit the encrypted at least one portion of the data communication to the secure target resource; and wherein the secure target resource is configured to decrypt the encrypted at least one portion of the data communication using the second cryptographic communications key.

According to a disclosed embodiment, the at least one portion of the data communication is a payload portion of the data communication.

According to a disclosed embodiment, the machine-readable encoded code is an encoded visual code.

According to a disclosed embodiment, making available, the machine-readable encoded code, includes including, in an interface of an application, the machine-readable encoded code.

According to a disclosed embodiment, making available, the machine-readable encoded code, includes displaying the machine-readable encoded code.

According to a disclosed embodiment, the machine-readable encoded code is made available using near-field wireless communications.

According to a disclosed embodiment, the at least one portion of the data communication cannot be decrypted without using the second cryptographic communications key.

According to a disclosed embodiment, the machine-readable encoded code further encodes a temporary and unique code.

According to a disclosed embodiment, the temporary and unique code is a universally unique identifier.

According to a disclosed embodiment, the first cryptographic communications key is uniquely associated with the personal computing device.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
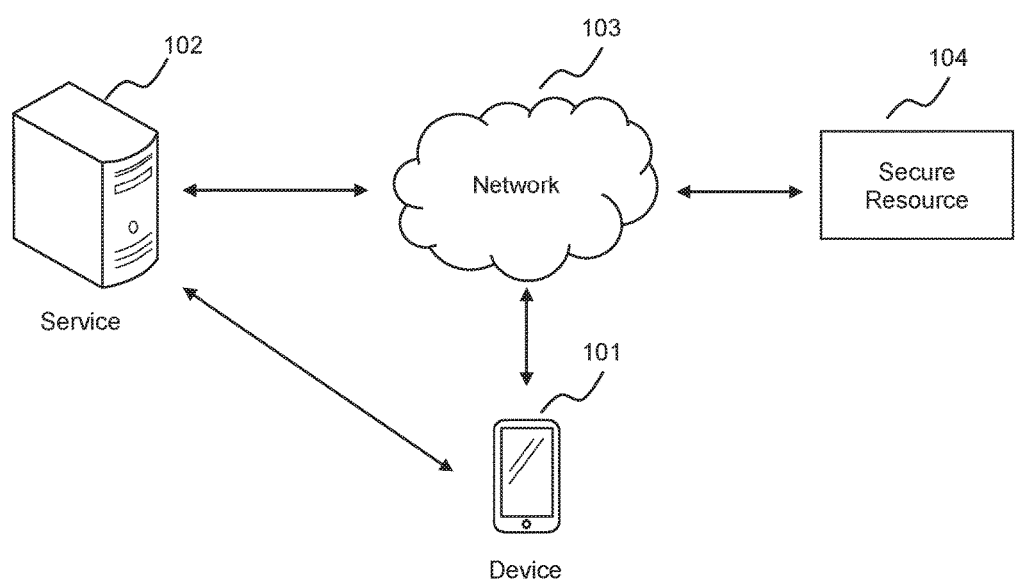
FIG. 1 is a block diagram of an exemplary system for authenticating users of personal computing devices using encoded versions of the temporary and unique codes in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods; procedures; and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of secure authentication and data communications addressed herein overcome several important technical problems in the fields of data identity security, data security, and communications security. Rather than rely on passwords or other secrets or credentials for security, which may be weak, often changing; hard-coded, or hard to remember, the techniques discussed below utilize machine-readable codes in novel ways to enhance identity authentication and data communication security.

For example, in some embodiments a security service may generate a unique authentication identifier, which it may encode into a machine-readable code (e.g., QR code, encoded image, audible code, etc.) that is made available to a personal computing device (e.g.; mobile phone; tablet, etc.). The personal computing device may decode the machine-readable code to yield the authentication request identifier, use biometric input from the user to decrypt a locally stored private (or symmetric) cryptographic key, and sign or encrypt a communication back to the security service including the authentication identifier using the decrypted private (or symmetric) key.

The security service may then use a corresponding public (or symmetric) key to validate the signature of the communication or decrypt the communication and verify the authentication identifier. Further, the security service may associate the authentication identifier and decryption key with a particular identity or account associated with the personal computing device. Notably, these techniques do not require use of passwords or other authentication credentials for the user. According to these techniques, even if an attacker gains access to the personal computing device, and to the machine-readable code, the attacker will still lack the valid user's biometrics, and thus will be unable to complete the authentication process. As discussed below, this authentication process may be used in a variety of contexts, such as controlling secure access to applications, operating systems, computing resources, IoT devices, vehicles, buildings, rooms, transactions, and more.

Additionally, techniques discussed below facilitate secure data communications. For example, a security service may maintain a first (e.g., public or symmetric) cryptographic key where a second (e.g., private or symmetric) key is accessible to a secure target resource. The security service may generate a machine-readable code including the first key, and make the code available to a personal computing device. The personal computing device may then decode the code to reveal the first key, encrypt at least a portion of a communication using the first key, and transmit the encrypted portion or encrypted communication to the secure target resource. The secure target resource may then be able to decrypt and validate the communication using its second (e.g., private or symmetric) cryptographic key. This technique may additionally be used in combination with the above authentication technique, to ensure the data communications are both authenticated and validated. In addition, the same entity may be both a security service and a secure target resource. According to these techniques, even if an attacker intercepts a communication from the personal computing device, it will be unable to decrypt and understand the communication without the second cryptographic key maintained by the secure target resource. Additionally, communications lacking the encryption based on the first key from the security service may be found invalid by the secure target resource.

Reference will now be made in detail to the disclosed embodiments, examples of which are illustrated in the accompanying drawings.

FIG. 1 illustrates an exemplary system 100 for utilizing machine-readable encoded codes to provide secure communications between personal computing devices and secure target resources. As illustrated, personal computing device 101 may communicate directly or via network 103 with security service 102 to authenticate an identity (e.g., user, application, etc.) associated with personal computing device 101. Once the identity associated with personal computing device 101 is authenticated, the identity may securely access an application or other resource available on personal computing device 101 itself, on security service 102 itself, or from a separate secure resource 104.

In various embodiments, personal computing device 101 may be a computing device with hardware and software configured to receive, decode, and process machine-readable codes. For example, personal computing device 101 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home device, industrial device, etc.), personal computer (e.g., a desktop or laptop), or various other devices capable of processing and/or receiving data. Exemplary components of personal computing device 101 are further discussed below in connection with FIG. 3.

Security service 102 may be implemented in a variety of arrangements. For example, in some embodiments security service 102 may be part of a network or device requiring authentication of an identity associated with personal computing device 101. In an enterprise network, for instance, security service 102 may be a server, gateway, security agent, or other resource in the enterprise network that is deployed to require authentication of an identity associated with personal computing device 101 in order for the identity to access a secure application or other resource. Similarly, in a hotel or building security environment, security service 102 may be part of the hotel or building network and configured to require authentication of the identity before access is permitted to a particular room or other area. In further embodiments, security service 102 may be remotely situated from the service it is protecting. For example, security service 102 may be a server, virtual machine (e.g., based on AWS™, Azure™, IBM Cloud™, etc.), container instance (e.g., Docker™ container, Java™ container, Windows Server™ container, etc.), or other virtualized instance. Exemplary components of security service 102 are further discussed below in connection with FIG. 3.

In some embodiments, personal computing device 101 communicates directly with security service 102. For example, such direct communications may be short-range wireless communications (e.g., NFC, RFID, Bluetooth™, Bluetooth™ low energy, infrared, etc.). In further embodiments, such direct communications may include audible communications (e.g., based on a loudspeaker and microphone), light-based communications, vibration-based communications, or other types of local and wireless communications. In further embodiments, such direct communications may be wired (as opposed to wireless) communications (e.g., USB, Ethernet, Firewire, eSATA, etc.). Consistent with the discussion below, communications between personal computing device 101 and security service 102 may involve machine-readable codes encoding certain information (e.g., unique authentication identifiers, cryptographic keys, etc.), unique identity identifiers themselves, cryptographic keys themselves, as well as session data.

In further embodiments, personal computing device 101 communicates indirectly with security service 102 via network 103. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, infrared, etc.), or various other types of network communications. In some embodiments, the communications may take place across two or more of these forms of networks and protocols. Like the direct communications noted above, communications between personal computing device 101 and security service 102 via network 103 may involve machine-readable codes encoding certain information (e.g., unique identifier, cryptographic keys, etc.), unique identifiers, cryptographic keys, as well as session data.

Further, in some embodiments as discussed further below, when security service 102 makes available a machine-readable code to personal computing device 101, the code is made available to a display medium for personal computing device 101 to read. For example, the display medium may be a webpage (e.g., HTML-based, Java™-based, Flash™-based, etc.) being accessed by personal computing device 101, an application interface being displayed on personal computing device 101, a physical medium accessible to personal computing device 101 (e.g., a television screen, display screen, projected image, printed card, printed sticker, printed page, etc.), or other display media. In such situations, the machine-readable code may be transmitted from security service 102 via network 103 to the display medium.

Once an identity associated with personal computing device 101 has been authenticated, as discussed further below, the identity may be authorized to access a secure application or other resource. For example, in some embodiments a secure application may be unlocked or made accessible on personal computing device 101 itself, or from security service 102 itself. In other embodiments, upon authentication of the identity, a secure application or resource may be made accessible from a separate system, such as secure resource 104. Secure resource 104 may be, for example, a secure application hosted in an on-premises or cloud-based network (e.g., an operating system, a human resources application, financial application, secure database, source code repository, customer list, etc.). Further, secure resource 104 may be a physical location, such as a hotel room, office room, office entrance, conference room, parking garage, etc. In additional embodiments, secure resource 104 may be an IoT device, such as a network-connected vehicle, a smart home appliance, a network-based sensor, etc.

Figure 2:
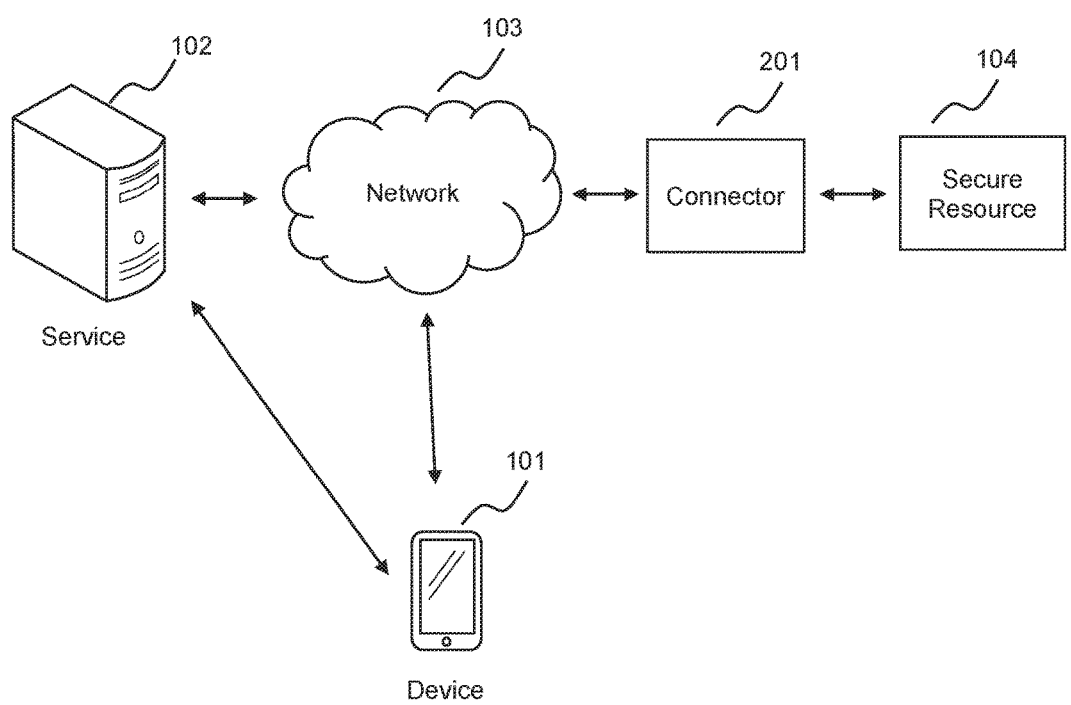
FIG. 2 is a block diagram of an exemplary system where a connector is configured to provide authenticated users with access to a secure resource in accordance with disclosed embodiments.

As illustrated in FIG. 2, in some embodiments a connector resource 201 may be deployed to facilitate access by an identity of personal computing device 101 to secure resource 104. For example, connector resource 201 may be configured to, upon a successful authentication of the identity as confirmed by security service 102, facilitate establishing a session between personal computing device 101 and secure resource 104. In this role, connector resource 201 may, for example, establish a secure tunnel between personal computing device 101 and secure resource 104. Exemplary types tunnels may include Secure Shell (SSH) tunnels, Generic Routing Encapsulation (GRE) tunnels, Layer 2 Tunneling Protocol (L2TP) tunnels, or various other types of tunnels. Alternatively, connector resource 201 may establish an encrypted communication session between personal computing device 101 and secure resource 104. In some embodiments, connector resource 201 may further facilitate a log-on or session initiation between personal computing device 101 and secure resource 104. For example, connector resource 201 may support logging the identity on to an account or application at secure resource 104 using an identity provisioning technique such as OpenID, OAuth, Security Assertion Markup Language (SAML), or others. Through such techniques, the identity associated with personal computing device may be provisioned with an identity (in some cases, a temporary or one-time-use identity) for use in securely communicating with secure resource 104. The resulting communications session may be, in some embodiments, encrypted or may use a secure tunnel, as discussed above.

Figure 3:
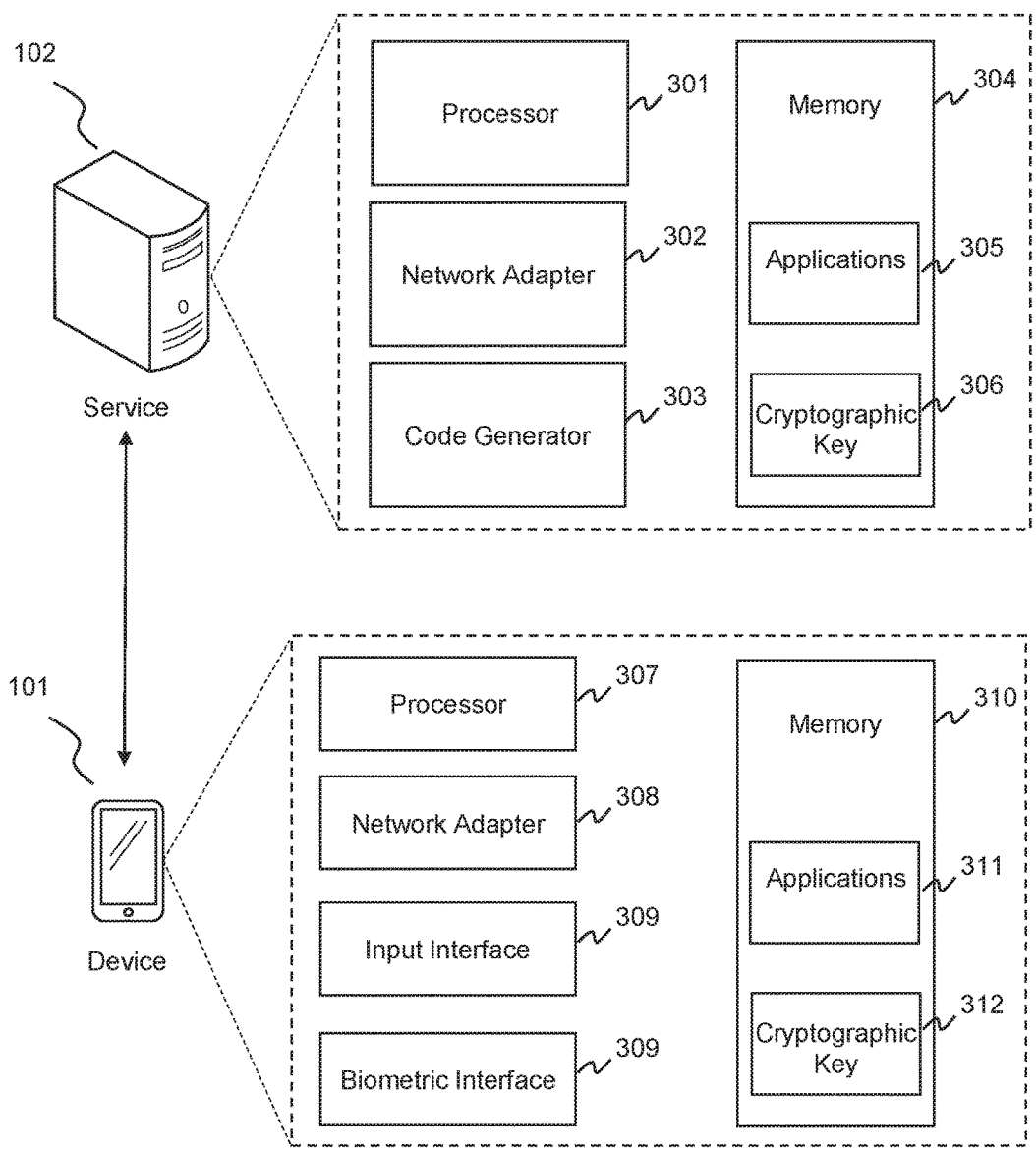
FIG. 3 is a block diagram of an exemplary system including a security service and a personal computing device in accordance with disclosed embodiments.

FIG. 3 is a block diagram of an exemplary system 300 including a security service 102 and a personal computing device 101. FIG. 3 illustrates exemplary components of security service 102 and personal computing device 101. Not all of the illustrated components are required to implement the functionality discussed below, and additional components may be added consistent with the discussed functionality as well.

As illustrated, security service 102 and personal computing device 101 may each include components such as processor 301/307. Processor (or processors) 301/307 may include one or more data or software processing devices. For example, processor 301/307 may take the form of, but is not limited to, a microprocessor, embedded processor, or the like, or may be integrated in a system on a chip (SoC). Furthermore, according to some embodiments, processor 301/307 may be from the family of processors manufactured by Intel®, AMO®, Qualcomm®, Apple®, NVIDIA®, or the like. Processor 301/307 may also be based on the ARM architecture, a mobile processor, or a graphics processing unit, etc. In some use cases, processor 301 may be a server processor while processor 307 may be a mobile device processor. The disclosed embodiments are not limited to any particular type of processor configured in security service 102 or personal computing device 101.

Security service 102 and personal computing device 101 may also each include a network adapter 302/308. Network adapters 302/308 may include one or more network interfaces or communication devices (e.g., Ethernet, cellular, WiFi, Bluetooth®, RFID, NFC, RF, infrared, etc.) to communicate with each other as well as other machines and devices. Further, security service 102 and personal computing device 101 may each include one or more memories 304/310. Memory (or memories) 304/310 may include one or more storage devices or media configured to store instructions used by processors 301/307, respectively, to perform functions related to the disclosed embodiments. Memory 304/310 may be configured to store software instructions, such as programs, that perform one or more operations when executed by the processor 301/307 to authenticate an identity of personal computing device 101 or securely transmit data, as discussed in connection with FIGS. 4A-4D and 5A-5C below. The disclosed embodiments are not limited to particular software types or devices configured to perform dedicated tasks. For example, memory 304/310 may store a single program, such as a user-level application, that performs the functions of the disclosed embodiments, or may comprise multiple software programs. Additionally, the processor 301/307 may in some embodiments execute one or more programs (or portions thereof). Furthermore, the memory 304/310 may include one or more storage devices or media configured to store data for use by the programs. In some cases, memory 310 of personal computing device 101 may be a secure mobile memory environment (e.g., ARM TrustZone™, Apple Secure Enclave™, Google Titan M™, Android Trusted Execution Environment™, etc.). In such embodiments, the secure memory environment may also have a separate secure processor for performing some or all of the functionality discussed below.

Memory 304/310 may also be configured to store executable applications or code 305/311. For example, security service 102 may execute applications 305 configured to perform the functionality of FIG. 4A-4D or 5A-5C discussed below, as well as other applications. Similarly, personal computing device 101 may execute applications 311 to participate in the functionality of FIG. 4A-4D or 5A-5C as well. Additionally, memory 304/310 may include cryptographic keys 306/312 and/or applications 305/311 for generating cryptographic keys 306/312. For example, in embodiments utilizing symmetric cryptographic keys, the symmetric keys may be generated using algorithms such as Twofish, DES, Blowfish, AES, Serpent, etc. In embodiments utilizing asymmetric keys, the keys may be generated using algorithms such as RSA, Transport Layer Security (TLS), S/MIME, PGP, GPG, or various other algorithms In some embodiments, as discussed further below, security service 102 may generate the cryptographic keys and send one or more keys to personal computing device 101, while in further embodiments personal computing device 101 may generate the cryptographic keys and send one or more keys to security service 102. Additionally, in some embodiments the cryptographic keys may be generated elsewhere (e.g., at a separate credentials vault, such as a CyberArk™ vault) and provisioned to personal computing device 101 or security service 102 as needed.

As illustrated in FIG. 3, security service 102 may also include code generator 303. Code generator 303 may allow security service 102 to generate a scannable or machine-readable code that encodes information (e.g., an authentication identifier, cryptographic key, etc.). Code generator 303 may be a separate component of security service 102, for example, with dedicated processors and/or memories. In other embodiments, code generator 303 may be integrated into memory 304 and/or processor 301. For example, code generator 303 may be a software code, a script, or application stored on memory 304 and/or executed by processor 301. Code generator 303 may be capable of encoding information according to a variety of different formats, such QR code (e.g., using ISO/IEC 18004:2015), data matrix code, Aztec code, PDF417 code, MicroPDF417 code, CodaBlock-F code, MaxiCode code, Microsoft Tag code, Shotcode code, encoded image, geometric pattern, color pattern, etc. In some embodiments, code generator 303 is configured to generate an audible code that may be produced via a loudspeaker of security service 102 and received via a microphone of personal computing device 101. Other encoding formats are possible as well.

As discussed above, personal computing device 101 may be any device capable of reading or scanning a machine-readable code or image generated by security service 102. Personal computing device 101, for example, may be a mobile device, such as a mobile phone, a tablet, a laptop, an e-reading device, a handheld gaming device, a digital camera, a mobile PC, a digital calculator, or the like. Personal computing device 101 may also be a wearable device, such as a smart watch, a fitness tracker, smart jewelry, or various other wearable devices. In some embodiments, personal computing device 101 may be a device with a dedicated scanning functionality, such as a handheld image or document scanner. Personal computing device 101 may also be a stationary device, such as a desktop or laptop computer with an auxiliary scanning component in communication with the device.

Personal computing device 101 may have an input interface 309 configured to receive a variety of types of user input. For example, input interface 309 may enable a user of personal computing device to enter alphanumeric input, control a cursor, or provide touchscreen control (e.g., via a keyboard, mouse, touchscreen interface, stylus, pen, etc.) for interacting with applications 311. Additionally, input interface 309 may in some embodiments include a microphone, vibration sensor, light sensor, optical scanning device, gyroscope, accelerometer, or various other types of sensors. Consistent with the embodiments discussed below, input interface 309 may enable personal computing device 101 to detect and read (e.g., optically scan, audibly pick up, etc.) the machine-readable code being generated by security service 102.

In addition, personal computing device 101 may include biometric interface 309. Biometric interface 309 may be configured to detect or scan a variety of types of physical or biological traits of a user, such as a fingerprint, retina, face, voice, hair follicle, heart rate pattern, walking or stepping pattern, or more. Biometric interface 309 may be, in some embodiments, configured by a user of personal computing device 101 as part of an initial device configuration for personal computing device 101. In other embodiments, biometric interface 309 may be configured after initialization (e.g., by an administrator, or as part of a process of installing a security application on personal computing device 101 configured to implement the security techniques discussed below). As discussed below, biometric interface 309 (alone or in conjunction with an application 311) may be used to control access to a cryptographic key 112 (e.g., private key or symmetric key) that is encrypted and stored in memory 310. For example, application 311 may require a successful biometric authentication of the user before decryption of, or access to, cryptographic key 312 is allowed.

Figure 4A:
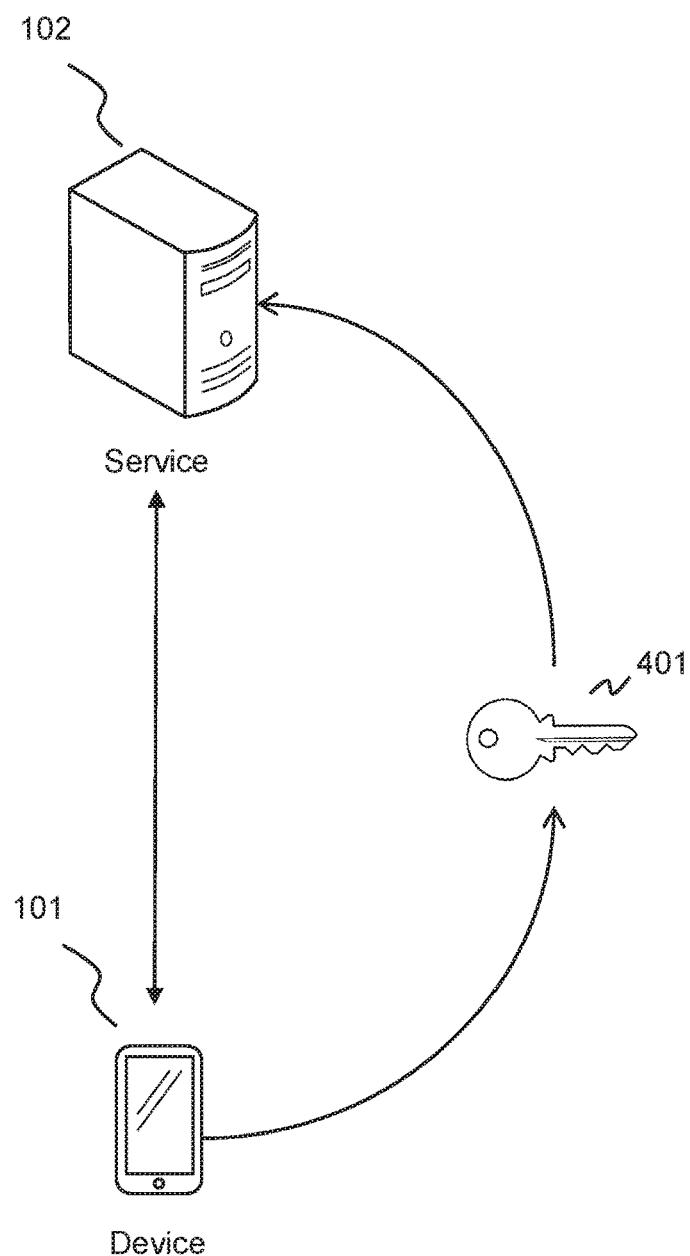
FIG. 4A is a block diagram of an exemplary system for a personal computing device to provide a cryptographic key to a security service in accordance with disclosed embodiments.

FIG. 4A illustrates a block diagram of an exemplary system 400A for personal computing device 101 to provide cryptographic key 401 to security service 102. For example, during an initial registration phase (e.g., when personal computing device 101 is first initialized, or when a security application is installed for performing the functionality discussed below) personal computing device 101 may generate an asymmetric public-private key pair, or alternatively may generate a symmetric key. As part of the registration process, personal computing device 101 may transmit the public key, or a copy of the symmetric key, to security service 102. This transmission may be initiated by personal computing device 101 (e.g., a "push") or may be initiated by security service 102 (e.g., a "pull") during the registration phase. Additionally, or alternatively, cryptographic key 401 may be transmitted from personal computing device 101 to security service 102 periodically (e.g., daily, monthly, etc.) or based on a detected need for secure authentication (e.g., based on detecting personal computing device 101 requesting access to secure resource 104).

In some embodiments, security service 102 may also receive and store a user ID of personal computing device 101 in association with the cryptographic key 401. The user ID may be a unique identifier associated with an identity of personal computing device 101, or associated with personal computing device 101 itself. The user ID may be, for example, an identity name, account name, IP address, MAC address, device serial number, Android™ Advertising ID, Mobile Device Identifier, etc.). In some embodiments, security service 102 may generate a new user ID for an identity of personal computing device 102 based on the information provided to it from personal computing device. If security service 102 does generate such a new user ID, it may provide the user ID to personal computing device 101.

As an alternative to FIG. 4A, in some embodiments security service 102 itself will generate a cryptographic key or key pair, and may then transmit a key to personal computing device 101. For example, security service 102 may generate a public-private key pair, and transmit the public key to personal computing device 101. Alternatively, security service 102 may generate a symmetric key and transmit a copy to personal computing device 101. In further embodiments, cryptographic key 401 may be provisioned from a separate resource (e.g., network vault, such as CyberArk™ vault).

Figure 4B:
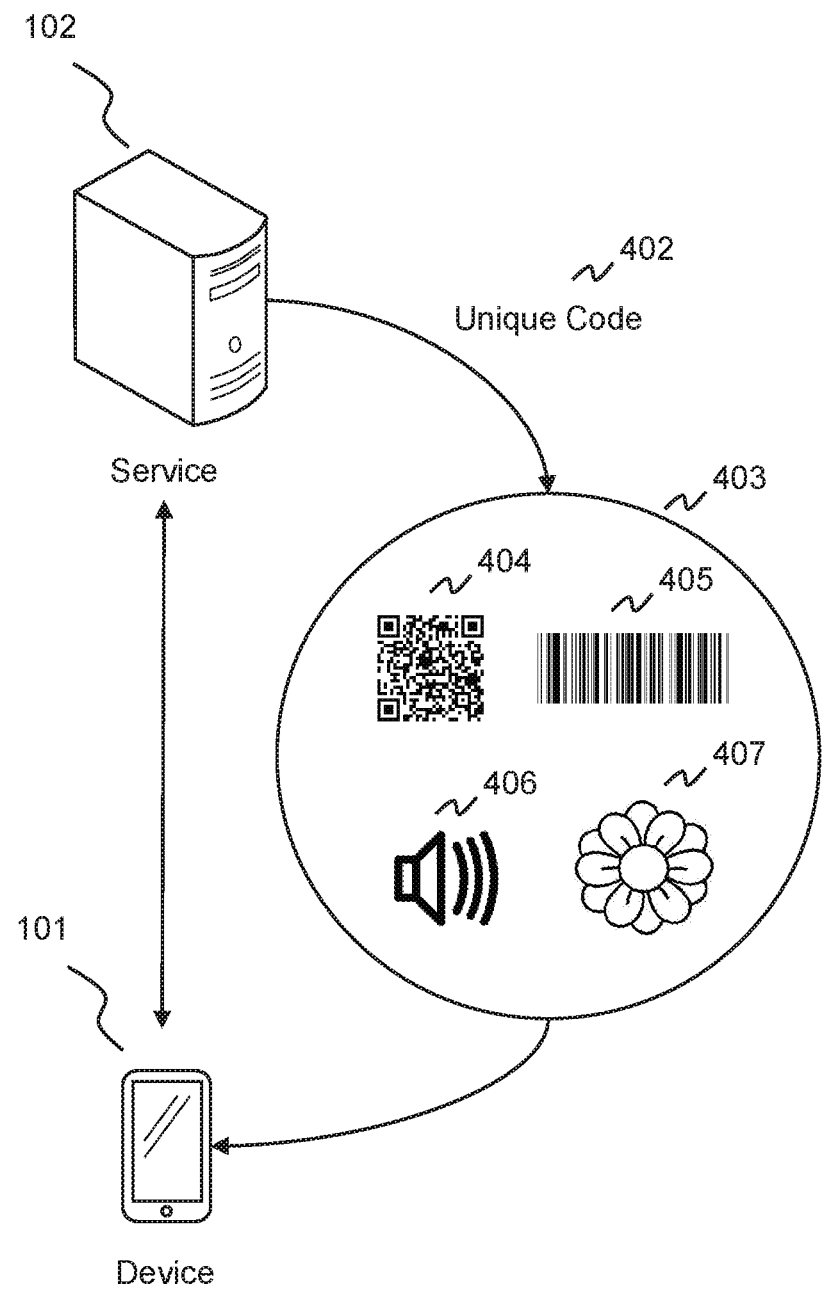
FIG. 4B is a block diagram of an exemplary system for a security service to provide an encoded machine-readable code to a personal computing device in accordance with disclosed embodiments.

FIG. 4B illustrates a block diagram of an exemplary system 400B for security service 102 to provide an encoded machine-readable code 403 to personal computing device 101. As discussed above, machine-readable code 403 may encode information according to a variety of techniques. For example, machine-readable code 403 may be a two-dimensional barcode (e.g., QR code 404), a one-dimensional barcode (e.g., barcode 405), an audible signal (e.g., signal 406), an encoded image (e.g., icon 407), or various other types of encoded data.

Security service 102 may encode into machine-readable code 403 particular data used in the authentication process of the identity associated with personal computing device 101. For example, machine-readable code 403 may encode a unique authentication ID. The authentication ID may be a unique value or string of characters. For example, the authentication ID may be a universally unique identifier (UUID) or a random value. In some embodiments, the authentication ID may be unique in the sense of having a limited lifespan, a single-use limitation, a single-session limitation, etc.

As discussed above, machine-readable code 403 may be made available to personal computing device 101 in a variety of ways. For example, machine-readable code 403 may be included in a web page (e.g., HTML-based, Java™-based, Flash™-based, etc.) or application interface that a user of personal computing device 101 is interfacing with. Further, machine-readable code 403 may be displayed on a screen or surface proximate to personal computing device (e.g., display screen, television, device screen, vehicle screen, projector display, etc.). In additional embodiments, machine-readable code 403 may be printed onto a physical medium (e.g., card, sticker, page, etc.).

Once personal computing device 101 detects and reads (e.g., scans or picks up) machine-readable code 403, it may decode the code according to the technique used to encode it. For example, if machine-readable code 403 was generated by security service 102 as a QR code, personal computing device 101 may decode machine-readable code 403 according to the OR code specification as well. Once personal computing device 101 has decoded machine-readable code 403, the encoded contents of machine-readable code 403 will be revealed to personal computing device 101. For example, if a unique authentication code was encoded into machine-readable code 403 as discussed above, the unique code will now be accessible to personal computing device 101.

Figure 4C:
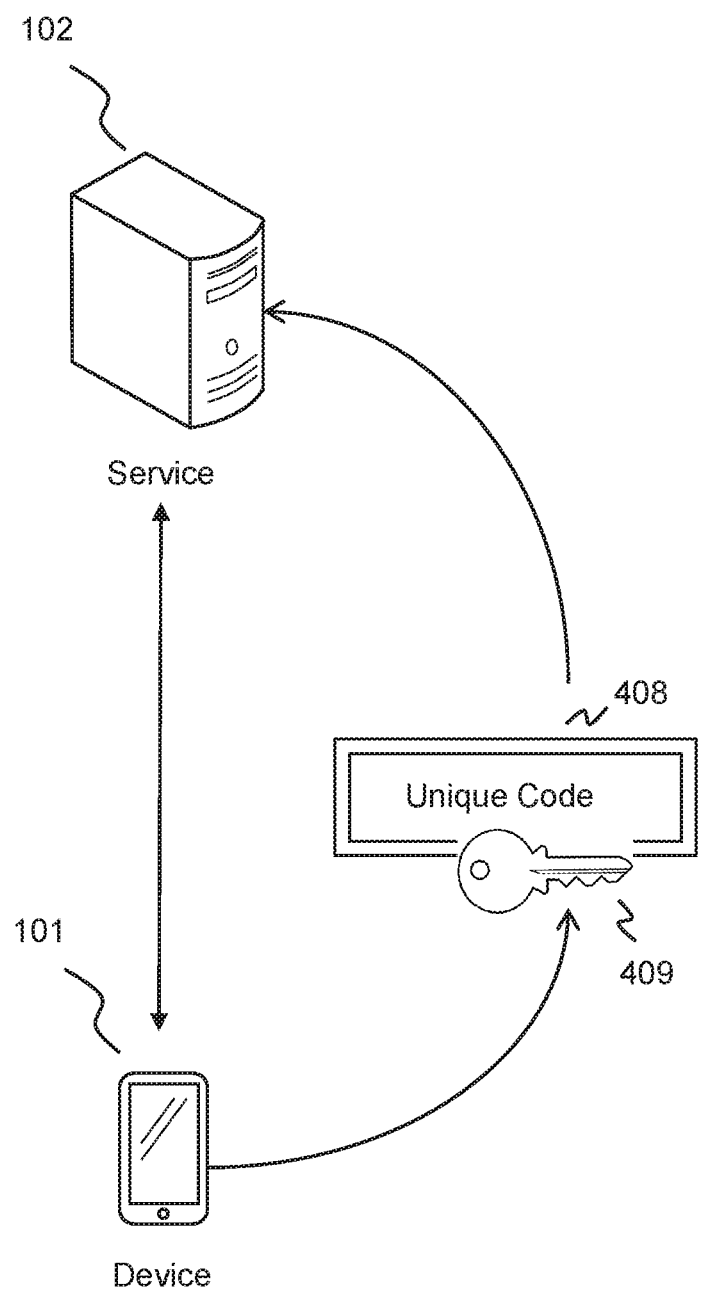
FIG. 4C is a block diagram of an exemplary system for a personal computing device to provide a signed version of a unique code to a security service in accordance with disclosed embodiments.

FIG. 4C illustrates a block diagram of an exemplary system 400C for personal computing device 101 to provide a signed version of unique code 408, using cryptographic key 409, to security service 102. For example, personal computing device 101 may prompt a user to perform a biometric verification on personal computing device 101. This may be based, for example, on a visual or audible prompt generated by personal computing device 101 requesting the user to perform a biometric verification. Alternatively, this may involve accessing a result of a biometric verification that the user of personal computing device 101 has already performed (e.g., as part of unlocking personal computing device 101).

As discussed above, personal computing device 101 may store in memory (in some cases, a secure mobile memory environment) a cryptographic key 409. For example, cryptographic key 409 may be a private key generated (or received) from an asymmetric public-private key pair, or may be a symmetric key. Cryptographic key 409 may be encrypted based on the user's biometric data. For example, raw data associated with the user's detected biometrics, a hash of that data, or a confirmation result value of a successful biometric verification may be used to encrypt key 409 in memory on personal computing device 101. Accordingly, once a user of personal computing device 101 performs a biometric input (e.g., based on fingerprint, retina, face, voice, hair follicle, heart pattern, walking pattern, etc.), a result of that biometric input may be used to decrypt key 409. For example, raw data from the biometric input, a hash of that data, or data resulting from a successful biometric verification may be used to decrypt key 409. In some embodiments, a user ID stored on personal computing device 101 may also be retrieved. The user ID may, in some cases, be encrypted based on the user's biometric data as well, and if so, may correspondingly be decrypted based on the user performing a biometric verification. Of course, if the user is unable to decrypt key 409 (e.g., based on a failed biometric verification), key 409 may remain encrypted and inaccessible to the user.

Once key 409 has been successfully decrypted based on the user's biometric validation, key 409 may be used to sign an outgoing communication back to security service 102. The communication may include the authentication ID code. Further, in some embodiments the communication may also include the user ID. The communication may be signed in a variety of ways. For example, a field containing the authentication ID code may be signed, a field containing the user ID may be signed, or a different field (e.g., header, body, footer, etc.) may be signed using key 409, thus producing signed unique code 408. Further, in some embodiments the entire communication may be signed with key 409.

Once security service 102 receives signed unique code 408 (e.g., containing the authentication ID code and/or user ID), it may locate a corresponding cryptographic key associated with the personal computing device (e.g., based on a look-up of the user ID). For example, if the unique code 408 is signed with a private key 409, security service 102 may retrieve a corresponding public key. Alternatively, if unique code 408 is signed with a symmetric key 409, security service 102 may retrieve a corresponding (e.g., identical) symmetric key. Based on the retrieved key, security service 102 may verify the signature contained in the received communication. For example, security service 102 may compare and verify a hash resulting from applying the retrieved key to the signed field in the communication. If the signature of the received communication is successfully verified based on the retrieved key, the particular identity associated with personal computing device 101 (e.g., the user ID) or personal computing device 101 itself may be authenticated. If the signature in the received communication is not validated, or no signature is found, the identity or personal computing device 101 may not be authenticated. Further, in some situations responsive measures may be taken based on a failed authentication (e.g., generating an alert based on the identity of personal computing device 101 or the user ID, requiring two-factor authentication or additional authentication, disabling the cryptographic key associated with the identity or the user ID, disabling an account associated with the identity or the user ID, etc.).

Figure 4D:
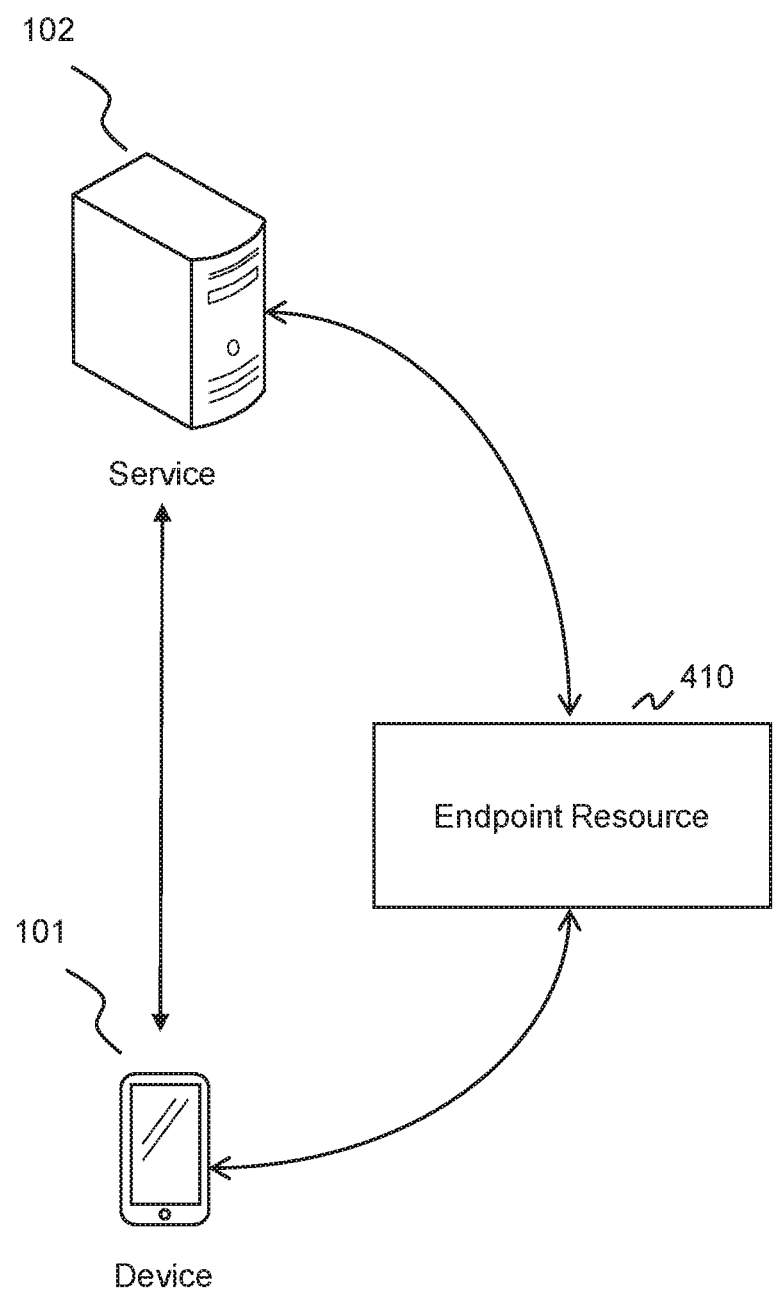
FIG. 4D is a block diagram of an exemplary system for an authenticated personal computing device to access an endpoint resource in accordance with disclosed embodiments.

As discussed above, based on a successful verification of the identity of personal computing device 101 (e.g., the user ID), the identity may be permitted to access a secure application or other resource. The secure application or resource may be one available locally on personal computing device 101 itself or at security service 102 itself. Further, as illustrated in FIG. 4D, the secure resource may be endpoint resource 410. Consistent with the above discussion, endpoint resource 410 may be a variety of target resources, such as an operating system, application, server, database, IoT device, network-connected vehicle, hotel room, building, conference room, etc. In some embodiments, as discussed above in connection with FIG. 2, secure access to endpoint resource 410 may be provided via connector 201 (e.g., through an encrypted session, a secure tunnel, etc.). Further in some embodiments connector 201 may function as an identity provider to provision an identity for personal computing device 101 and perform a log-on to an application or resource provided by endpoint resource 410.

In some embodiments consistent with FIGS. 4A-4D, security service 102 may provide additional security enhancements. For example, in some embodiments a personal computing device may be monitored for signs of a potential breach (e.g., root pack, misuse, failed authentication, etc.). For example, if personal computing device 101 is detected by security service 102 to be providing communications to security service 102 that lack the unique and temporary authentication code, have an invalid signature, have no signature at all, or have a different user ID, security service 102 may determine that personal computing device 101 has potentially been jeopardized or compromised. In that case, security controls (e.g., disabling the user ID, rotating or disabling the cryptographic keys for that user ID, or other controls may be implemented to prevent personal computing device 101 from potentially infecting or attacking other resources. Further, the techniques of FIGS. 4A-4D may be practiced to provide a secure identity transfer between two devices. For example, upon successfully authenticating one personal computing device 101, an identity of that personal computing device may be transferred to a second personal computing device (or vice versa). This identity transfer may happen, for example, using near-field (NFC) communications, Bluetooth™ infrared, etc. As an additional enhancement, the level of technological sophistication of personal computing device 101 may be sensed periodically or from time to time by security service 102. For example, if security service 102 specifies that only facial recognition (or a more advanced biometric recognition) is required for personal computing device 101, less advanced types of biometric recognition (e.g., speech recognition) may be deemed insufficient for biometric authentication. This may be, for example, an update that security service 102 pushes to a security application running on personal computing device 101. With such security updates, organizations may continually update their security policies for personal devices so that a threshold level of security is present among such devices.

Figure 5A:
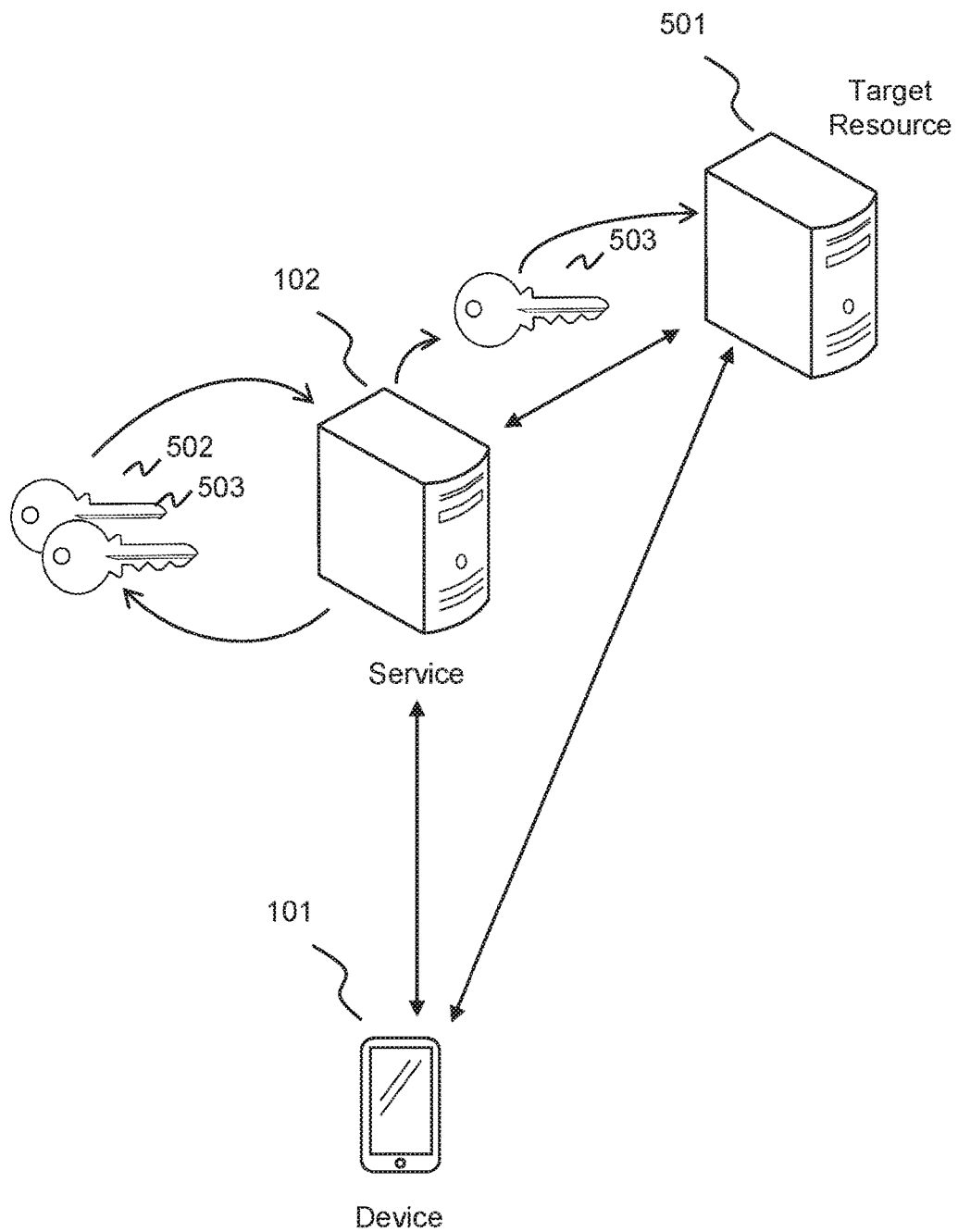
FIG. 5A is a block diagram of an exemplary system where a security service accesses cryptographic keys and provides at least one cryptographic key to a target resource in accordance with disclosed embodiments.

FIG. 5A illustrates an exemplary system 500A where security service 102 accesses cryptographic keys 502-503 and provides at least one cryptographic key 503 to target resource 501. As discussed further below, FIG. 5A describes a system 500A that, in conjunction with the functionality described in FIGS. 5B and 5C, may allow personal computing device 101 to securely communicate with target resource 501. In some embodiments, target resource 501 may be similar to secure resource 104 or endpoint resource 410, as discussed above. That is, target resource 501 may be an application or other network-accessible resource with which personal computing device 101 is seeking to securely communicate. As examples, target resource 501 may be an on-premises enterprise application, a cloud-based (e.g., AWS™, Azure™, IBM Cloud™, etc.) application, an IoT application, in-vehicle application, etc.

As illustrated in FIG. 5A, security service 102 may access or generate cryptographic keys 502-503. For example, as discussed above, security service 102 may have key generation software configured to create an asymmetric key pair (e.g., based on RSA, TLS, S/MIME, PGP, GPG, or various other algorithms), or a symmetric key (e.g., based on algorithms such as Twofish, DES, Blowfish, AES, Serpent, etc.). Alternatively, in some embodiments security service 102 may receive keys 502 and/or 503 externally (e.g., from personal computing device 101 or a separate credentials vault, such as a CyberArk™ vault). Once security service 102 has received or generated keys 502-503, it may provide one of the keys, key 503, to target resource 501. For example, the private or public key, or the symmetric key, may be transmitted to target resource 501. In some embodiments, key 503 is transmitted to target resource 501 during an initialization or registration phase, as discussed above. Alternatively, key 503 may be transmitted to target resource 501 as needed (e.g., when personal computing device requests access to target resource 501, requests authentication, etc.).

Figure 5B:
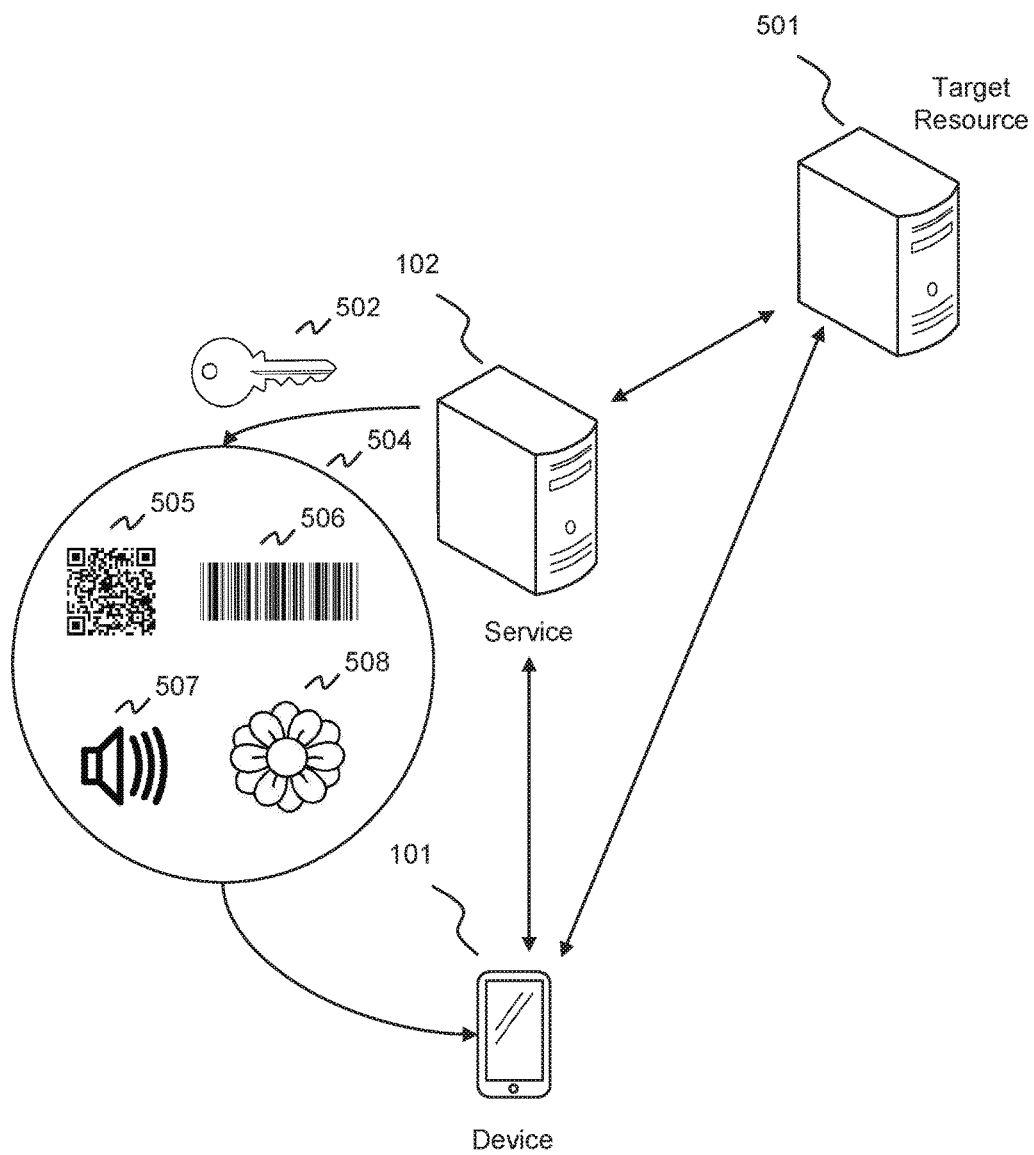
FIG. 5B is a block diagram of an exemplary system where a security service provides a machine-readable code to a personal computing device in accordance with disclosed embodiments.

FIG. 5B illustrates a block diagram of an exemplary system 500B where security service 102 provides machine-readable code 504 to personal computing device 101. Consistent with the discussion above, machine-readable code 504 may encode information to be used in facilitating authentication of an identity associated with personal computing device 101 and/or secure communications between personal computing device 101 and target resource 501. For example, machine-readable code 504 may encode a unique authentication ID, as discussed above in connection with FIGS. 4A-4D. In embodiments discussed in connection with FIGS. 5A-5C, moreover, machine-readable code 504 may encode cryptographic key 502. In some embodiments, the unique authentication ID and cryptographic key 502 are both encoded into machine-readable code 504, while in other embodiments separate machine-readable codes 504 are used to separately encode the unique authentication ID and cryptographic key 502.

As discussed above, machine-readable code 504 may be encoded according to a variety of techniques, such as QR code 505, barcode 506, audible code 507, encoded image 508, or others. Further, consistent with the above discussion, machine-readable code 504 may be made available to personal computing device 101 in a variety of ways. For example, machine-readable code 504 may be transmitted to personal computing device 101 (e.g., as part of a web page, application interface, etc.), may be displayed or projected on a screen or panel (e.g., television, display screen, device screen, projector screen, etc.), or may be printed to a physical medium (e.g., card, sticker, paper, etc.).

The particular encoding technique used to encode information (e.g., unique authentication ID and/or cryptographic key 502) into machine-readable code 504 may then be applied by personal computing device 101 itself to decode machine-readable code 504, thus yielding the contents of the code. Personal computing device 101 may then have access to the unique authentication ID or cryptographic key 502. In embodiments where an identity associated with personal computing device 101 is to be authenticated, the authentication may be performed as discussed above regarding FIGS. 4A-4D. For example, a user of personal computing device 101 may perform a biometric input verification, a result of which is used to decrypt a locally stored private or symmetric key, which can then be used to sign an outgoing communication to security service 102. In embodiments where this authentication is performed, this authentication may be, in some embodiments, required before personal computing device 101 can perform secure data communications with target resource 501, as discussed below. For example, the authentication of the identity may, in some embodiments, be needed for personal computing device to transmit encrypted communications to target resource 501.

Figure 5C:
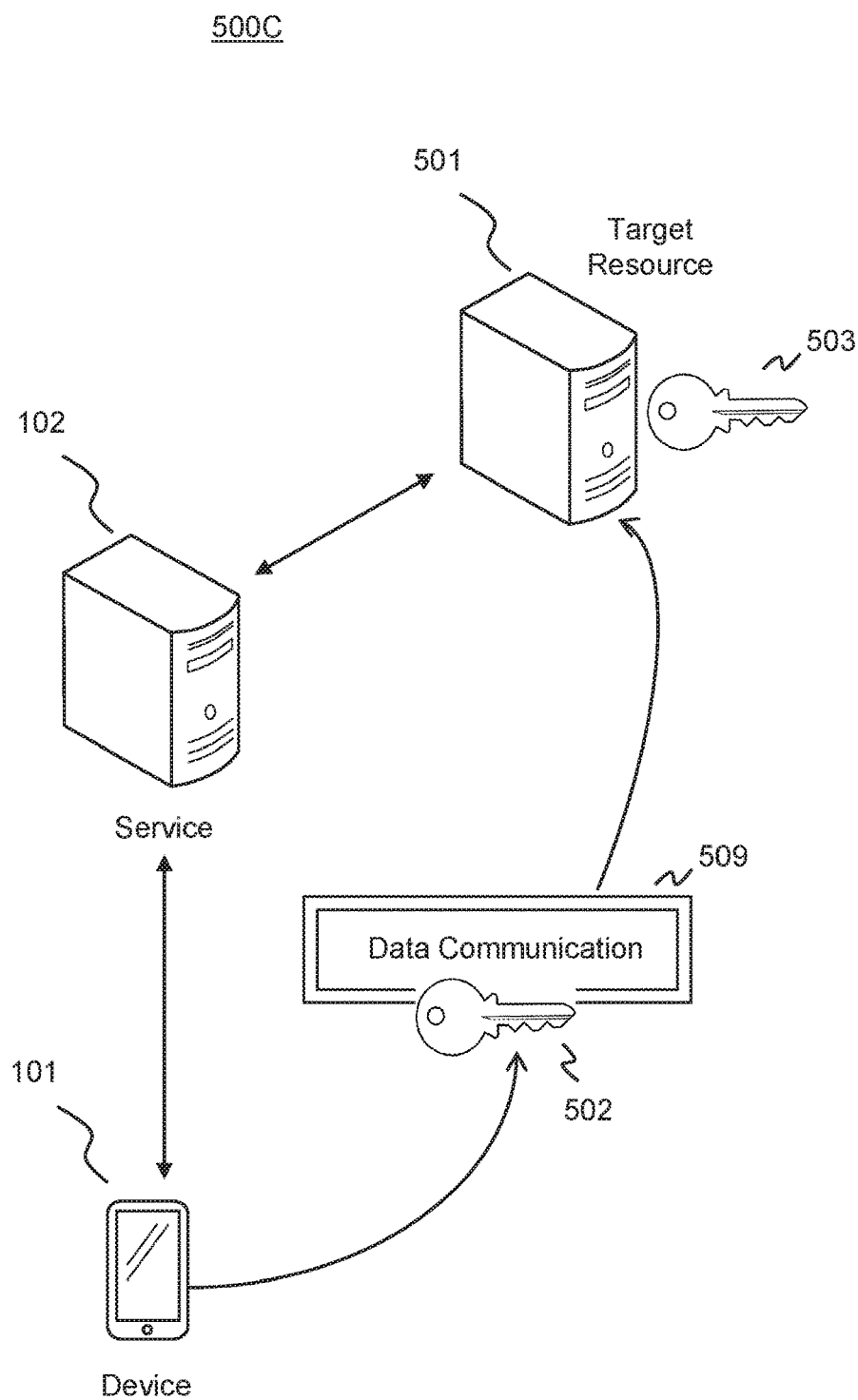
FIG. 5C is a block diagram of an exemplary system where a personal computing device encrypts a data communication that is transmitted to a target resource in accordance with disclosed embodiments.

Once personal computing device 101 has obtained cryptographic key 502 from machine-readable code 504, personal computing device 101 may encrypt at least a portion of a data communication addressed to target resource 501. For example, as shown in FIG. 5C, personal computing device 101 may use key 502 to encrypt a header field, a footer field, or body portion, or the entire communication itself, thus forming an encrypted communication 509, before transmitting the communication 509 to target resource 501. Consistent with the discussion above, in embodiments using connector 201, connector 201 may facilitate the transmission of the communication 509 to target resource 501. For example, connector 201 may function as a proxy agent or proxy server, which intercepts communications 509 from personal computing device 101 addressed to target resource 501. If connector 201 detects and intercepts such a communication 509, it may in some embodiments verify with security service 102 whether the identity has been authenticated. Connector 201 may further establish a secure (e.g., encrypted, or tunneled, etc.) communication session between personal computing device 101 and target resource 501. Additionally, where connector 201 functions as an identity provider, connector 201 may provision an identity for personal computing device 101 or log-in the identity to an application of target resource 501.

As shown in FIG. 5C and system 500C, target resource 501 may then access cryptographic key 503 that it was provisioned, and may use key 503 to decrypt encrypted communication 509. For example, where key 503 is a private key, key 502 may be the corresponding public key, and where key 503 is a public key, key 502 may be the corresponding private key. Additionally, where keys 502 and 503 are symmetric, both keys may be identical. Target resource 501 may then provide secure data communications between a secure application or other resource it hosts (e.g., operating system, server, application, database, physical room, IoT device, vehicle, etc.) and personal computing device 101. As discussed above, where connector 201 is utilized, connector 201 may further provision a tunnel for the communications, may provision an identity for the personal computing device 101, and may further log-in the personal computing device 101 into an account or session.

Figure 6:
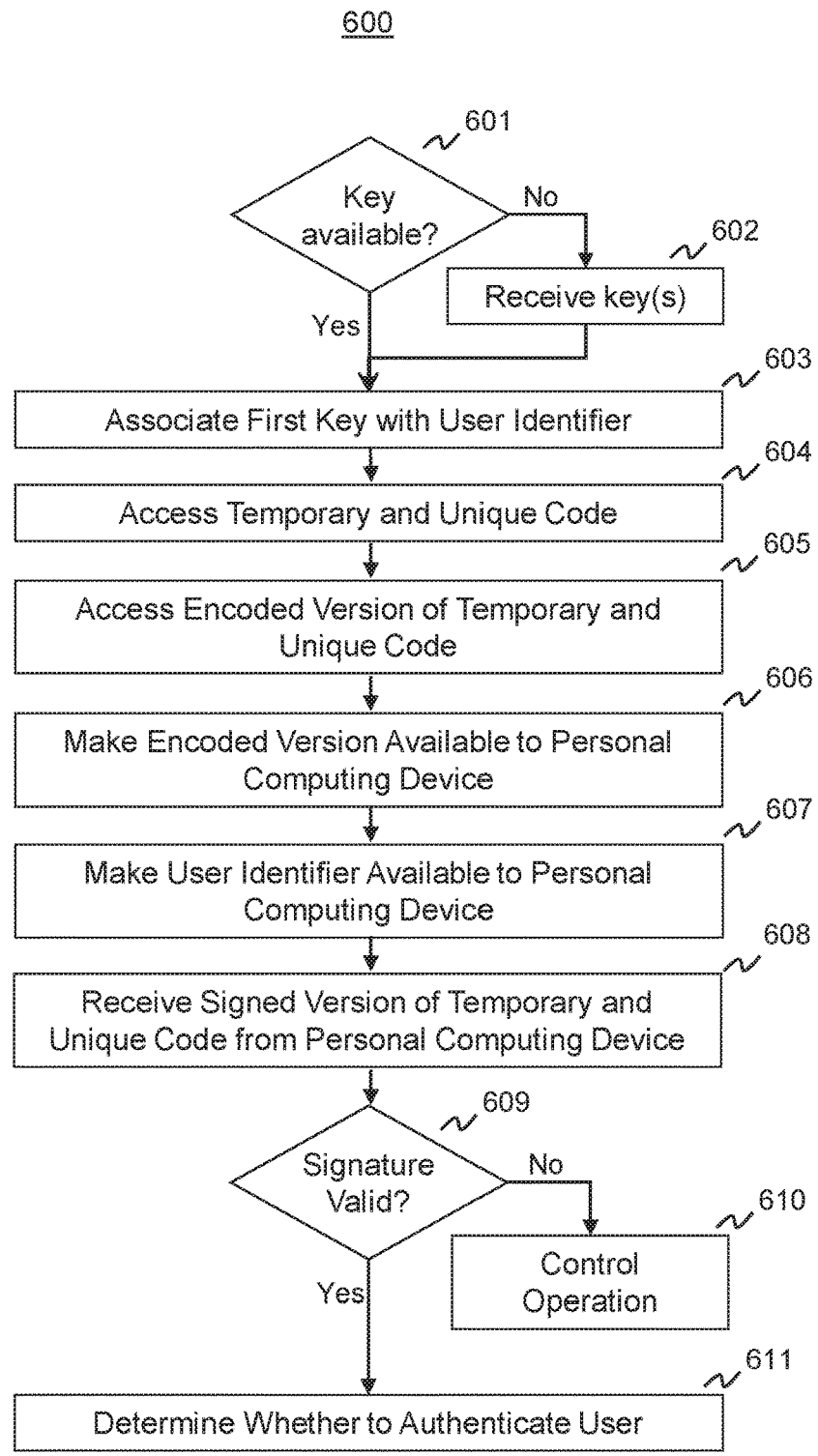
FIG. 6 is a flowchart of an exemplary process for a security service in authenticating users of personal computing devices using encoded versions of the temporary and unique codes in accordance with disclosed embodiments.

FIG. 6 illustrates a flowchart of an exemplary process 600 for a security service in authenticating users of personal computing devices using encoded versions of the temporary and unique codes, Consistent with the discussion above, process 600 may be implemented in the system environments of FIG. 1 or 2, and may be performed by a security service, such as security service 102 of FIGS. 1-3, 4A-4D, and 5A-5C.

Process 600 may include an operation 601 of determining whether a cryptographic key is available For example, as discussed above, personal computing device 101 may generate an asymmetric key pair or a symmetric key, and provide a key (e.g., public key or symmetric key) to security service 102. In operation 601, if security service 102 has not yet received a key corresponding to personal computing device 101, it may obtain the key in operation 602, As discussed above, cryptographic keys may be obtained not only from personal computing device 101, but further in other embodiments may be generated by security service 102 itself or retrieved from a separate vault (e.g., Cyber-Ark™ vault).

Operation 603 of process 600 includes associating the received or generated key (e.g., public key or symmetric key) with a user identifier. As discussed above, during a registration or update process, personal computing device 101 may provide various identifying data to security service 102 (e.g., identity name, account name, IP address, MAC address, device serial number, Android™ Advertising ID, Mobile Device Identifier, etc.). In some embodiments, this received data may be the user identifier maintained by security service 102 and associated with the cryptographic key. Further, in other embodiments security service 102 may generate a new user ID for the identity of personal computing device 101 based on the received information. If security service 102 generates such a new user ID, it may store it in association with the cryptographic key.

In operation 604, process 600 may include accessing a temporary and unique code. As discussed above, this may include retrieving or generating a unique value (e.g., UUID) or random value. The temporary and unique code may be valid for a defined time period, for a single use, for a single session, or based on other time-limiting parameters.

In operation 605, process 600 may include accessing an encoded version of the temporary and unique code. Consistent with the above discussion, the encoding may be performed according to a variety of techniques. Encoding types may be, for example, two-dimensional barcodes, one-dimensional barcodes, encoded images, geometric or color patterns, audible sounds, etc. The temporary and unique code (e.g., UUID or random value) may be encoded into the encoded version such that a decoding device (e.g., decoding interface of personal computing device 101) may decode the code to reveal the contents (e.g., the temporary and unique code).

Operation 606 of process 600 may include making available over short-range communications, to the personal computing device, the encoded version of the temporary and unique code. The encoded code may be made available to the personal computing device in various ways. As discussed above, for example, the encoded code may be included in a web page (e.g., HTML-based, Java™-based, Flash™-based, etc.), an application interface, etc. Further the encoded version may be displayed proximate to the personal computing device (e.g., via a television, display screen, projected display, in-vehicle display, device-based display, IoT display, etc.). In some embodiments, moreover, the encoded version may be displayed in printed form (e.g., on a card, sticker, paper, etc.).

Process 600 may also include, in some embodiments, operation 607 of making available to the personal computing device a user identifier. The user identifier may be the same user identifier discussed above in connection with operation 603. For example, the user identifier may be a unique identifier identifying the personal computing device itself, or a user thereof. In some embodiments, the user identifier is the actual identifier that identifies the personal computing device or user, while in other embodiments the user identifier may be a name or value that is created by security service for use by the personal computing device.

In operation 608, process 600 may include receiving, from the personal computing device, a signed version of the temporary and unique code, the signed version having been signed by the second cryptographic key. The processing performed by the personal computing device was discussed above, and is further described in connection with FIG. 7. For example, the personal computing device may perform a biometric verification of the user, and use data resulting from the biometric verification to decrypt a private or symmetric key stored locally on the personal computing device. The private or symmetric key may then be used to sign a communication sent back to the security service. The communication may be signed in a variety of ways using the key (e.g., signing the temporary and unique code itself, signing a different field in the communication, or signing the entire communication).

In operation 609, the security service may then determine whether the signature of the signed communication is valid. For example, using the first cryptographic key stored at the security service and linked to the user ID of the identity, the security service may attempt to verify the signature using the corresponding second cryptographic key. For example, if the first key is a public key, the second key may be the corresponding private key. Alternatively, the first and second keys may both be the same symmetric key.

If the signature of the communication is not successfully verified by the first cryptographic key in operation 609, or if the communication contains no signature, process 600 may proceed to operation 610 of performing a control operation. For example, operation 610 may involve disabling an account or identity associated with the user ID or the personal computing device. Further, operation 610 may include prompting the personal computing device for two-factor authentication or additional authentication. In some embodiments, operation 610 may further involve generating an alert or report identifying the user ID and/or the personal computing device.

If the signed communication is successfully verified using the first cryptographic key in operation 609, the security service may determine that the identity associated with the personal computing device has been authenticated in operation 611. Consequently, as discussed above, the identity may be permitted to access a secure application available on the personal computing device itself, from the security service itself, or from a separate resource. For example, the identity may be able to log in to a service, operating system, or application, may be permitted access to a physical location (e.g., building, hotel room, conference room, etc.), or may be permitted access to a device or vehicle, among potentially other operations.

Figure 7:
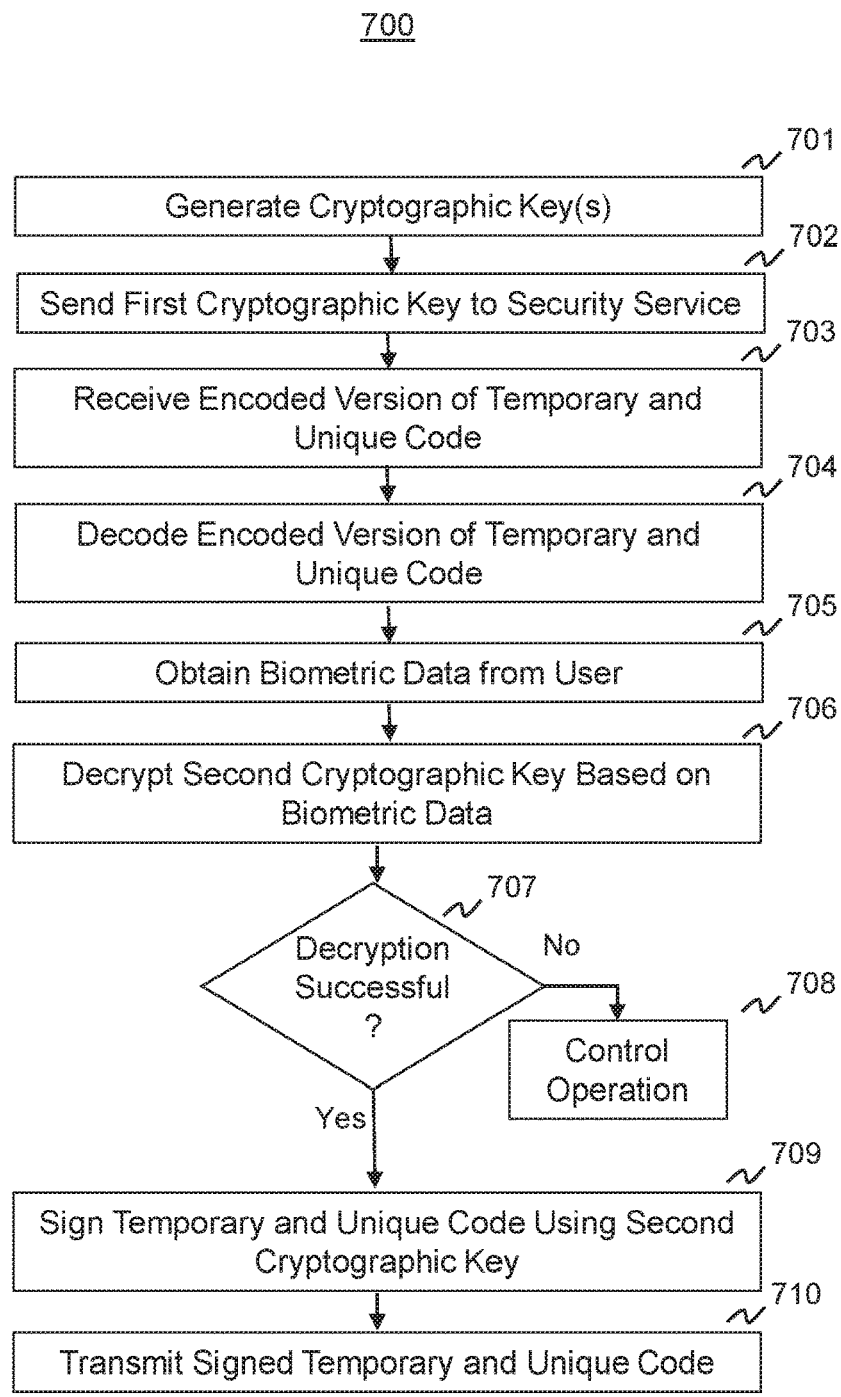
FIG. 7 is a flowchart of an exemplary process for a personal computing device authenticating users of personal computing devices using encoded versions of the temporary and unique codes in accordance with disclosed embodiments.

FIG. 7 illustrates a flowchart of an exemplary process 700 for a personal computing device participating in authenticating a user of the personal computing device using encoded versions of the temporary and unique codes. Process 700 may be performed by a personal computing device (e.g., device 101 as discussed above), and may complement process 600 from the perspective of the personal computing device.

In operation 701, a personal computing device may generate one or more cryptographic keys. For example, in some embodiments the personal computing device may asymmetrically generate a private-public key pair, or may symmetrically generate a symmetric key. The personal computing device may store a key (e.g., the private or symmetric key) in a local storage. In some embodiments, the local storage may be a secure storage environment on the personal computing device (e.g., ARM TrustZone™, Apple Secure Enclave™, Google Titan M™; Android Trusted Execution Environment™, etc.). Further, the personal computing device may encrypt the key using biometric data associated with the user. For example, the stored key may be encrypted using raw biometric data of the user, a hash of such data, or data resulting from a successful biometric identification. In addition to storing this key (e.g., private or symmetric key) locally, the personal computing device may transmit the corresponding key (e.g., public or symmetric) to the security service in operation 702. Of course, in embodiments where the security service generates the keys, or the keys are retrieved from a separate vault, operation 701 may not be needed.

In operation 703, process 700 includes receiving an encoded version of a temporary and unique code. For example, as discussed above the security service may access (e.g., retrieve or generate) a unique and temporary code (e.g., UUID, random number, etc.). The security service may encode the unique and temporary code into an encoded format (e.g., QR code, one-dimensional barcode, encoded image, encoded sound, etc.) and make the encoded version available to the personal computing device. Once the personal computing device receives or scans the encoded version in operation 703, it may decode the encoded version in operation 704 to yield the contents (e.g., the unique and temporary code).

The personal computing device may then generate a prompt (e.g., visual, audible, etc.) for the user to perform a biometric input verification in operation 705. As discussed above, this may involve the user performing a fingerprint scan, retinal scan, voice detection, hair follicle scan, heart beat pattern, walking pattern, or other physical or biometric trait to the personal computing device. Alternatively, in some embodiments operation 705 may involve accessing a previously performed biometric verification of the user (e.g., done at log-on to or unlocking of the personal computing device). Using a result of the biometric identification (e.g., raw biometric data, a hash of such data, or data produced based on a successful biometric identification), such resulting data may be used to decrypt the locally stored cryptographic key (e.g., private or symmetric key) in operation 706. In operation 707, if the decryption is determined to be successful (e.g., based on comparing a hash of the decryption to a valid hash), process 700 may proceed to operation 709. Alternatively, if the decryption is unsuccessful, process 700 may lead to operation 708 of performing a control operation. Operation 708 may include, for example, denying access to the stored cryptographic key, generating an alert for the user of the personal computing device, generating an alert for the security service, etc.

In operation 709, if the locally stored cryptographic key is successfully decrypted using the user's biometric verification data, the personal computing device may then sign a communication to be transmitted back to the security service using the decrypted cryptographic key. For example, the personal computing device may construct a communication where the temporary and unique code is signed with the decrypted key, where a different field of the communication is signed, or where the entire communication is signed. The signed communication may then be transmitted back to the security service in operation 710. As discussed above, the security service can then verify the signature using its corresponding cryptographic key (e.g., public or symmetric key). Upon a successful verification of the signature, as discussed above, the identity associated with the personal computing device may be successfully authenticated.

Figure 8:
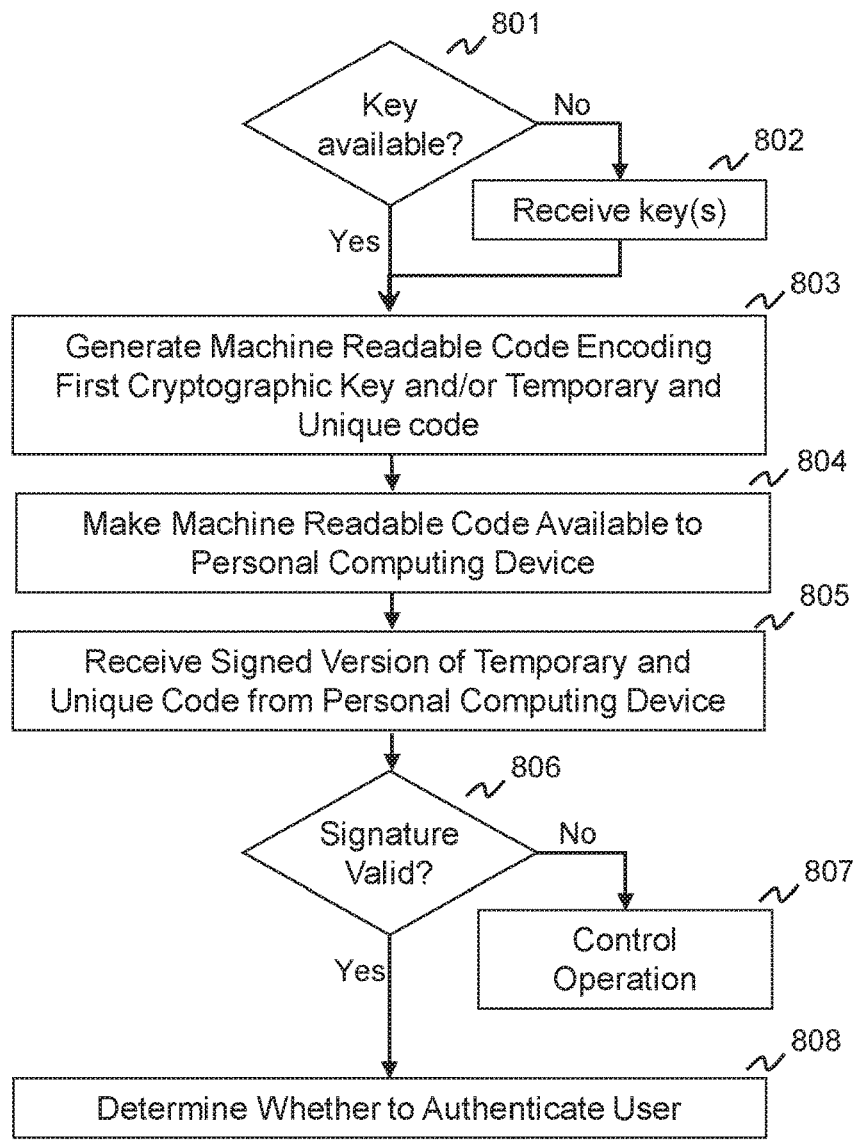
FIG. 8 is a flowchart of an exemplary process for a security service in utilizing machine-readable encoded codes to provide secure communications between personal computing devices and secure target resources in accordance with disclosed embodiments.

FIG. 8 illustrates a flowchart of an exemplary process 800 for a security service to perform in utilizing machine-readable encoded codes to provide secure communications between personal computing devices and secure target resources. Consistent with the disclosure above, process 800 may be implemented by a security service in communication with a personal computing device and/or target resource. For example, process 800 may be performed by security service 102 in above embodiments.

In an operation 801, process 800 may include checking whether cryptographic keys are already stored and available to the security service. For example, as discussed above, the security service may function to generate a cryptographic key pair (e.g., public-private keys) or a symmetric key for use with a particular personal computing device and/or with a particular target resource. If in operation 801 the keys are already available at the security service, the process may continue to operation 803. If the keys are not available, the security service may obtain them in operation 802 (e.g., from the personal computing device itself, from a credentials vault, etc.) or generate them.

As discussed above, in addition to confirming that a cryptographic key pair or symmetric key is available in operation 801, process 800 may include providing a cryptographic key (e.g., private key or symmetric key) to the target resource. The target resource may then later use that key in decrypting communications from the personal computing device. Additionally, in some embodiments the security service, the target resource, or both, may store their respective cryptographic keys in association with a user ID associated with the personal computing device of an identity associated with the personal computing device. The user ID may take the forms discussed above, such as a unique identifier of the personal computing device, a unique identifier associated with the user, or a new ID created by the security service.

In operation 803, the security service may further generate a machine-readable encoded code which encodes the first cryptographic communications key. As discussed above, the machine-readable code may take several forms, such as a OR code, one-dimensional barcode, encoded image, audible sound, or more. Further, as discussed above, the machine-readable code may include not only the first cryptographic key but potentially also other data (e.g., a unique authentication ID, user ID, etc.). For example, in situations where the personal computing device is required to perform authentication of the personal computing device or an identity associated with it, the machine-readable code may include an authentication code which the personal computing device can process as discussed above regarding FIGS. 6-7. That is, the personal computing device may utilize a biometric verification of the use to decrypt a cryptographic key stored on the personal computing device, and then use that key to sign an authentication communication back to the security service. In various embodiments, one or more different machine-readable codes may be used to convey the unique authentication ID and the first cryptographic key to the personal computing device.

In operation 804, process 800 may include making available, to the personal computing device, the machine-readable encoded code. Consistent with above embodiments, the machine-readable encoded code may be made available in a variety of ways to the personal computing device, either directly or indirectly. For example, the machine-readable encoded code may be included in a web page or application interface being accessed by the personal computing device, displayed on a television or monitor accessible to the personal computing device, or printed onto a physical medium accessible to the personal computing device.

In operation 805, process 800 may include receiving a signed version of the temporary and unique code from the personal computing device. This may correspond, for example, to operation 608 of process 600. As discussed above, as part of an authentication process for the personal computing device, the personal computing device may utilize a biometric verification of the user to decrypt a locally stored key, which the personal computing device can then use to sign outgoing communications to the security service. As discussed above, the security service can then utilize its corresponding authentication key to verify the signature of the communication and thus authenticate the personal computing device. In particular, in operation 806, the security service may determine whether the signature is valid. If not, in operation 807, a control operation may be implemented for the personal computing device or an associated user ID. The control operation may, as discussed above, involve generating an alert, report, or other action regarding the personal computing device or user ID, disabling the personal computing device or user ID, etc.

On the other hand, if the verification of the signature is successful, process 800 may continue to operation 808 of authenticating the personal computing device or its associated identity. As discussed above, the personal computing device may then be authorized to access a secure application or other resource. Further, as discussed below, the personal computing device may be authorized to transmit encrypted communications to the target resource, as discussed in connection with FIGS. 5A-5C, and below.

Figure 9:
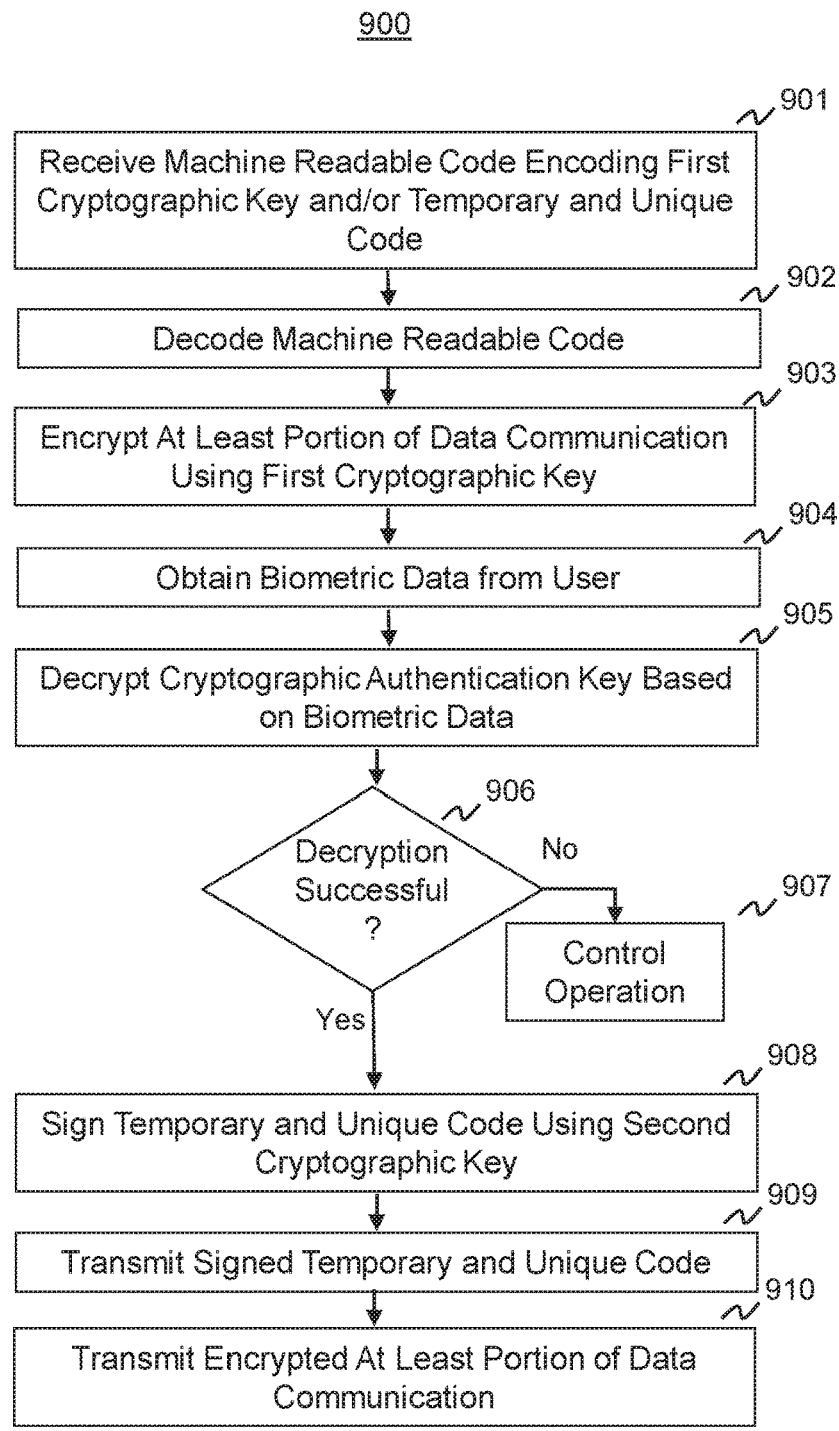
FIG. 9 is a flowchart of an exemplary process for a personal computing device in utilizing machine-readable encoded codes to provide secure communications between personal computing devices and secure target resources in accordance with disclosed embodiments.

FIG. 9 illustrates a flowchart of an exemplary process 900 for a personal computing device in utilizing machine-readable encoded codes to provide secure communications between personal computing devices and secure target resources. Process 900 may perform portions of the functionality described above in connection with FIGS. 5A-5C, from the perspective of the personal computing device (e.g., personal computing device 101). Accordingly, process 900 complements process 800 discussed above.

In an operation 901, a personal computing device may receive a machine-readable code encoding a first cryptographic key and/or a temporary and unique authentication code. As described above in connection with FIGS. 5A-5C, the cryptographic key may be a key (e.g., public or symmetric key) generated or accessed by the security service, for which a corresponding cryptographic key (e.g., private key or symmetric key) is made available to the target resource. In some embodiments, the same machine-readable code, or a separate machine-readable code, may additionally encode the temporary and unique identifier. This temporary and unique identifier may be an authentication identifier (e.g., UUID, random number, etc.) used for authentication of the personal computing device as described above in connection with FIGS. 4A-4D.

In embodiments involving authentication of the personal computing device using this temporary and unique identifier, process 900 may optionally involve a requirement that the personal computing device be successfully authenticated before proceeding to operation 903 of encrypting a portion of a data communication or operation 910 of transmitting encrypted data. For example, consistent with the discussion above regarding FIGS. 6-7, operation 904 may involve prompting the user to perform a biometric verification (or accessing a previously performed biometric verification), and attempting to decrypt a locally stored cryptographic key in operation 905. If the attempted decryption is determined in operation 906 to be unsuccessful, process 900 results in a control operation 907 (e.g., declining to provide access to the locally stored cryptographic key). If the operation is determined in operation 906 to be successful, process 900 continues to operation 908 of signing the temporary and unique code, or a communication including the temporary and unique code, and transmitting the signed communication back to the security service in operation 909. As discussed above, the security service may then access a corresponding key (e.g., public or symmetric key) and attempt to verify the signature to thereby authenticate the identity associated with the personal computing device.

If the above authentication of the identity is required, and is successful, process 900 may continue to operation 910 of transmitting the encrypted portion (or entirety) of the data communication to the target resource. As noted above, the encryption may be performed using the key (e.g., public or symmetric key) encoded into the machine-readable code that the security service transmitted to the personal computing device. Consistent with the discussion above in FIGS. 5A-5C and FIG. 8, if the target resource is then able to successfully decrypt the encrypted communication using its own key (e.g., the corresponding private or symmetric key), the target resource may establish a secure communication session with the personal computing device. Further, in embodiments using a connector (e.g., connector 201), the connector may establish a secure tunnel connection between the personal computing device and the target resource, and may further serve as an identity provider and provision an identity to the target resource (e.g., log-in the personal computing device to an application or other resource hosted by the target resource.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for authenticating users of personal computing devices using encoded versions of temporary and unique codes, the operations comprising:
- receiving a first cryptographic key, the first cryptographic key having been created by a personal computing device and corresponding to a second cryptographic key maintained on the personal computing device;
- associating a user identifier with the first cryptographic key;
- accessing a temporary and unique code;
- accessing an encoded version of the temporary and unique code;
- making available over short-range communications, to the personal computing device, the encoded version of the temporary and unique code;
- wherein the personal computing device is configured to decode the encoded version of the temporary and unique code to yield the temporary and unique code, to obtain biometric data from a user of the personal computing device, and to decrypt the second cryptographic key based on the obtained biometric data;
- receiving, from the personal computing device, a signed version of the temporary and unique code, the signed version having been signed by the second cryptographic key;
- verifying, using the first cryptographic key, the signed version of the temporary and unique code; and
- determining, based on the verifying, whether to authenticate the user of the personal computing device.

2. The non-transitory computer readable medium of claim 1, wherein accessing the temporary and unique code includes generating a universally unique identifier.

3. The non-transitory computer readable medium of claim 1, wherein the first cryptographic key is a public key from a public-private key pair generated by the personal computing device.

4. The non-transitory computer readable medium of claim 1, wherein the second cryptographic key is a private key from a public-private key pair generated by the personal computing device.

5. The non-transitory computer readable medium of claim 1, wherein the first cryptographic key and the second cryptographic key are each a symmetric key generated by the personal computing device.

6. The non-transitory computer readable medium of claim 1, wherein associating the user identifier with the first cryptographic key includes generating the user identifier and storing the user identifier in association the first cryptographic key.

7. The non-transitory computer readable medium of claim 1, wherein the operations further comprise providing the user identifier to the personal computing device.

8. The non-transitory computer readable medium of claim 1, wherein the personal computing device is further configured to decrypt the user identifier based on the biometric data.

9. The non-transitory computer readable medium of claim 1, wherein the operations further comprise receiving, from the personal computing device, a signed version of the user identifier, the signed version having been signed by the second cryptographic key.

10. The non-transitory computer readable medium of claim 1, wherein the user concurrently using the personal computing device and an endpoint resource requiring the authentication of the user.

11. A computer-implemented method for authenticating users of personal computing devices using encoded versions of temporary and unique codes, the method comprising:
- receiving a first cryptographic key, the first cryptographic key having been created by a personal computing device and corresponding to a second cryptographic key maintained on the personal computing device;
- associating a user identifier with the first cryptographic key;
- accessing a temporary and unique code;
- accessing an encoded version of the temporary and unique code;
- making available, to the personal computing device, the encoded version of the temporary and unique code;
- wherein the personal computing device is configured to decode the encoded version of the temporary and unique code to yield the temporary and unique code, to obtain biometric data from a user of the personal computing device, and to decrypt the second cryptographic key based on the obtained biometric data;
- receiving, from the personal computing device, a signed version of the temporary and unique code, the signed version having been signed by the second cryptographic key;
- verifying, using the first cryptographic key, the signed version of the temporary and unique code; and
- determining, based on the verifying, whether to authenticate the user of the personal computing device.

12. The computer-implemented method of claim 11, wherein making available the encoded version of the temporary and unique code includes at least one of: displaying the encoded version visually to the personal computing device, or wirelessly transmitting through near-field communications the encoded version to the personal computing device.

13. The computer-implemented method of claim 11, wherein the encoded version of the temporary and unique code is at least one of a two-dimensional bar code, a one-dimensional bar code, or an encoded image.

14. The computer-implemented method of claim 11, wherein the personal computing device includes an imaging interface configured to optically scan and decode the encoded version of the temporary and unique code.

15. The computer-implemented method of claim 11, wherein associating the user identifier with the first cryptographic key includes generating the user identifier and storing the user identifier in association with the first cryptographic key.

16. The computer-implemented method of claim 11, further comprising providing the user identifier to the personal computing device.

17. The computer-implemented method of claim 11, wherein the personal computing device is further configured to decrypt the user identifier based on the biometric data.

18. The computer-implemented method of claim 11, further comprising receiving, from the personal computing device, a signed version of the user identifier, the signed version having been signed by the second cryptographic key.

19. The computer-implemented method of claim 18, further comprising decrypting, using the first cryptographic key, the signed version of the user identifier.

20. The computer-implemented method of claim 11, further comprising providing, to an application requiring authentication of the user, an authenticated identity associated with the user based on the verifying.

\* \* \* \* \*